US006763195B1

(12) United States Patent
Willebrand et al.

(10) Patent No.: US 6,763,195 B1
(45) Date of Patent: Jul. 13, 2004

(54) HYBRID WIRELESS OPTICAL AND RADIO FREQUENCY COMMUNICATION LINK

(75) Inventors: Heinz Willebrand, Longmont, CO (US); Maha Achour, San Diego, CA (US)

(73) Assignee: LightPointe Communications, Inc., San Diego, CA (US)

( * ) Notice: Subject to any disclaimer, the term of this patent is extended or adjusted under 35 U.S.C. 154(b) by 0 days.

(21) Appl. No.: 09/482,782

(22) Filed: Jan. 13, 2000

(51) Int. Cl.[7] ............................................. H04B 10/00
(52) U.S. Cl. ...................... 398/115; 398/116; 398/118; 398/120; 398/135; 398/17; 398/19; 398/23; 398/24; 455/103; 455/74
(58) Field of Search ................................. 398/115, 116, 398/118, 120, 135, 17, 19, 23, 24; 455/103, 74

(56) References Cited

U.S. PATENT DOCUMENTS

| | | |
|---|---|---|
| 4,330,870 A | 5/1982 | Arends |
| 4,689,482 A | 8/1987 | Horikawa et al. |
| 4,807,222 A | 2/1989 | Amitay |
| 4,916,460 A | 4/1990 | Powell |
| 5,005,937 A | 4/1991 | Aida et al. |
| 5,034,997 A | 7/1991 | Iwasaki |
| 5,060,303 A | 10/1991 | Wilmoth |
| 5,068,916 A | 11/1991 | Harrison et al. |
| 5,083,874 A | 1/1992 | Aida et al. |
| 5,142,400 A | 8/1992 | Solinsky |
| 5,185,814 A | 2/1993 | Healey |
| 5,210,631 A | 5/1993 | Huber et al. |
| 5,218,467 A | 6/1993 | Ross et al. |
| 5,227,906 A | 7/1993 | Tokumitsu |
| 5,247,381 A | 9/1993 | Olmstead et al. |

(List continued on next page.)

FOREIGN PATENT DOCUMENTS

| | | |
|---|---|---|
| DE | 44 33 896 C1 | 11/1995 |
| DE | 4433896 C1 | 11/1995 |
| EP | 0 513 993 A2 | 11/1992 |
| EP | 0 378 148 B1 | 4/1996 |
| GB | 2 221 810 A | 2/1990 |
| GB | 2 257 321 A | 1/1993 |
| JP | S63-215125 | 7/1988 |
| WO | WO 98/32250 | 7/1998 |
| WO | WO 00/08783 | 2/2000 |
| WO | WO 00/16489 | 3/2000 |
| WO | WO 00/54413 | 9/2000 |
| WO | WO 01/52450 A2 | 7/2001 |

OTHER PUBLICATIONS

PCT International Search Authority; "Notification of Transmittal of the International Search Report"; "PCT International Search Report" for International Application No. PCT/US02/10075 which claims priority to U.S. Application No. 09/835,866; mailed Jul. 30, 2002; (4 pages).

(List continued on next page.)

*Primary Examiner*—Leslie Pascal
*Assistant Examiner*—Hanh Phan
(74) *Attorney, Agent, or Firm*—Fitch, Even, Tabin & Flannery

(57) ABSTRACT

A hybrid wireless optical and radio frequency (RF) communication link utilizes parallel free-space optical and RF paths for transmitting data and control and status information. The optical link provides the primary path for the data, and the RF link provides a concurrent or backup path for the network data, as well as a reliable and primary path for the control and status information. When atmospheric conditions degrade the optical link to the point at which optical data transmission fails, the hybrid communication link switches to the RF link to maintain availability of data communications. The switch may occur automatically, based on an assessment of the quality of the optical signal communicated through the optical path.

38 Claims, 8 Drawing Sheets

U.S. PATENT DOCUMENTS

| | | |
|---|---|---|
| 5,280,184 A | 1/1994 | Jokerst et al. |
| 5,301,054 A | 4/1994 | Huber et al. |
| 5,321,718 A | 6/1994 | Waarts et al. |
| 5,329,576 A | 7/1994 | Handforth |
| 5,331,449 A | 7/1994 | Huber et al. |
| 5,371,734 A | 12/1994 | Fischer |
| 5,390,040 A | 2/1995 | Mayeux |
| 5,400,166 A | 3/1995 | Huber |
| 5,416,627 A | 5/1995 | Wilmoth |
| 5,416,861 A | 5/1995 | Koh et al. |
| 5,416,864 A | 5/1995 | Cassidy et al. |
| 5,443,227 A | 8/1995 | Hsu |
| 5,448,391 A | 9/1995 | Iriyama et al. |
| 5,452,124 A | 9/1995 | Baker |
| 5,457,562 A | 10/1995 | Tremblay |
| 5,475,520 A | 12/1995 | Wissinger |
| 5,526,161 A | 6/1996 | Suzuki et al. |
| 5,548,772 A | 8/1996 | Lin et al. |
| 5,574,589 A | 11/1996 | Feuer et al. |
| 5,585,953 A | 12/1996 | Zavrel |
| 5,587,830 A | 12/1996 | Chraplyvy et al. |
| 5,596,661 A | 1/1997 | Henry et al. |
| 5,654,816 A | 8/1997 | Fishman |
| 5,659,413 A | 8/1997 | Carlson |
| 5,661,582 A | 8/1997 | Kintis et al. |
| 5,710,652 A | 1/1998 | Bloom et al. |
| RE35,736 E | 2/1998 | Powell |
| 5,748,813 A | 5/1998 | Cassidy et al. |
| 5,777,768 A | 7/1998 | Korevaar |
| 5,786,923 A | 7/1998 | Doucet et al. |
| 5,790,286 A | 8/1998 | Bae |
| 5,818,619 A | 10/1998 | Medved et al. |
| 5,818,984 A | 10/1998 | Ahmad et al. |
| 5,838,470 A | 11/1998 | Radehaus et al. |
| 5,844,705 A | 12/1998 | Rutledge |
| 5,859,725 A | 1/1999 | Sugiya et al. |
| 5,883,730 A | 3/1999 | Coult et al. |
| 5,917,629 A | 6/1999 | Hortensius et al. |
| 5,936,578 A | 8/1999 | Driessen et al. |
| 5,946,120 A * | 8/1999 | Chen ..................... 359/158 |
| 5,949,563 A | 9/1999 | Takada |
| 5,949,564 A | 9/1999 | Wake |
| 5,966,229 A * | 10/1999 | Dodley et al. ............ 359/187 |
| 5,978,118 A | 11/1999 | Flaherty |
| 5,983,068 A | 11/1999 | Tomich et al. |
| 5,995,253 A | 11/1999 | Flaherty |
| 6,014,236 A | 1/2000 | Flaherty |
| 6,016,212 A | 1/2000 | Durant et al. |
| 6,043,918 A | 3/2000 | Bozzay et al. |
| 6,049,593 A | 4/2000 | Acampora |
| 6,104,513 A | 8/2000 | Bloom |
| 6,115,157 A * | 9/2000 | Barnard et al. ........... 359/124 |
| 6,122,084 A | 9/2000 | Britz et al. |
| 6,141,128 A | 10/2000 | Korevaar et al. |
| 6,239,888 B1 * | 5/2001 | Willebrand ............... 359/118 |
| 6,272,271 B1 | 8/2001 | Wojnarowski et al. |
| 6,285,481 B1 * | 9/2001 | Palmer ................... 359/159 |
| 6,288,813 B1 | 9/2001 | Kirkpatrick et al. |
| 6,301,037 B1 | 10/2001 | Fischer et al. |
| 6,323,980 B1 | 11/2001 | Bloom |
| 6,348,986 B1 | 2/2002 | Doucet et al. |
| 6,366,723 B1 | 4/2002 | Medved et al. |
| 6,381,055 B1 | 4/2002 | Javitt et al. |
| 6,396,612 B1 * | 5/2002 | Bjorndahl ................ 359/172 |
| 6,398,425 B2 | 6/2002 | Williams et al. |
| 6,411,414 B1 | 6/2002 | Abate et al. |
| 6,452,700 B1 | 9/2002 | Mays, Jr. |
| 6,462,847 B2 | 10/2002 | Willebrand |
| 6,493,121 B1 | 12/2002 | Althaus |
| 6,509,992 B1 | 1/2003 | Goodwill |
| 6,583,904 B1 | 6/2003 | Mahlab et al. |
| 2002/0005972 A1 | 1/2002 | Bloom et al. |
| 2002/0027691 A1 | 3/2002 | Medved et al. |
| 2002/0028043 A1 | 3/2002 | Medved et al. |
| 2002/0048066 A1 | 4/2002 | Antoniades et al. |
| 2002/0051269 A1 | 5/2002 | Margalit et al. |
| 2002/0054411 A1 | 5/2002 | Heminger et al. |
| 2002/0054413 A1 | 5/2002 | Shivnan |
| 2002/0075542 A1 | 6/2002 | Kumar et al. |
| 2002/0122230 A1 | 9/2002 | Izadpanah et al. |
| 2002/0122232 A1 | 9/2002 | Doucet et al. |
| 2002/0141020 A1 | 10/2002 | Doucet et al. |
| 2002/0149811 A1 | 10/2002 | Willebrand |

OTHER PUBLICATIONS

PCT International Preliminary Examining Authority; "Notification of Trasmittal of the International Preliminary Examination Report"; "PCT International Preliminary Examination Report" for International Application No. PCT/US00/35198 which corresponds to U.S. Application No. 09/482,782; mailed Apr. 29, 2002; (13 pages).

PCT International Search Authority; "Notification of Transmittal of the International Search Report"; "PCT International Search Report" for International Application No. PCT/US00/35198 which corresponds to U.S. Application No. 09/482,782; mailed Feb. 6, 2002; (7 pages).

G. Nykolak et al.; "A 40 Gb/S DWDM Free Space Optical Transmission Link Over 4.4 km"; In Free–Space Laser Communication Techonologies XII; *Proceeding of SPIE;* vol. 3932, 2000; pp. 16–20.

P. F. Szajowski et al.; "Key Elements of High–Speed WDM Terrestrial Free–Space Optical Communications Systems"; In Free–Space Laser Communication Technologies XII; *Proceedings of SPIE;* vol. 3932; 2000; pp. 2–14.

G. Nykolak et al.; Update on 4x2.5 Gb/s, 4.4km free–space optical communications link: availability and scintillation performance; Part of the SPIE Conference on Optical Wireless Communications II; *SPIE;* vol. 3850; Sep. 1999; pp. 11–19.

P. F. Szajowski et al.; "High Power Optical Amplifiers Enable 1550 nm Terrestrial Free–Space Optical Data–Links Operating @ WDM 2.5 Gb/s Data Rates"; Part of the SPIE Conference on Optical Wireless Communications II; *SPIE;* vol. 3850; Sep. 1999; pp. 2–10.

European Patent Office; PCT International Preliminary Examination Report issued in the counterpart PCT application for U.S. Application No. 09/482,782, date of mailing 29.04.2002, 13 pages.

NASA Jet Propulsion Laboratory; "Multiple–Beam Transmission for Optical Communication"; http://www.nasatech.com/Briefs/Nov98/NPO20384.html; Oct. 26, 2001; pp.1–2.

P.S. Guilfoyle et al.; "Free–Space Interconnects for High–Performance Optoelectronic Switching"; *Computer; IEEE;* Feb. 1998; pp. 66–75.

I. I. Kim et al.; Scintillation Reduction Using Multiple Transmitters; *Society of Photo–Optical Instrumentation Engineers,* vol. 2990; 1997; pp. 102–113.

S. Hollung et al.; A Bi–Directional Quasi–Optical Lens Amplifier; *IEEE Transactions on Microwave Theory and Techniques;* vol. 45, No. 12; Dec. 1997; pp. 2352–2357.

C. M. Stickley et al.; Demonstration of an Adaptive, Coherent–Combining Laser Radar Receiver; *18th International Laser Radar Conference;* 1996; pp. 247–250.

K. Kimura et al.; "Global Satellite communication network using double–layered inclined orbit constellation with optical inter–satellite links"; ATR Optical and Radio Communications Research Laboratories, Kyoto, Japan; *SPIE;* vol. 2699; 1996; pp. 12–23.

A. Belmonte et al.; "Performance of a Multiple–Aperture Optical System"; *Society of Photo–Optical Instrumentation Engineers,* vol. 2699; 1996; pp. 316–326.

A. Louri et al.; "Feasibility Study for a Scalable Optical Interconnection Network for Massively Parallel Processing Systems"; *Applied Optics,* vol. 35, No. 8; Mar. 10, 1996; pp. 1296–1308.

E. Korevaar et al.; "Design of satellite terminal for BMDO lasercom technology demonstration"; *Society of Photo–Optical Instrumentation Engineers,* vol. 2381; Feb. 7–8, 1995, pp. 59–71.

K. Kimura et al.; "Satellite constellation of low earth orbit (LEO) satellite global communication network using optical inter–satellite links"; ATR Optical and Radio Communications Research Laboratories, Kyoto, Japan; *SPIE;* vol. 2381; 1995; pp. 48–59.

Lightpointe Communications, Inc.; "Complex Networking Connectivity Example: Allianz Insurance Germany"; 1995; p. 1.

Kube; "Renaissance Eines Alten Konzepts"; *Nachrichten Elektronik und Telematick;* vol. 49; No. 5; May 1995; pp. 15, 16 and 18. (English translation provided.).

Teleconnect GmbH; "Optische Freiraum–Übertragungssysteme"; Teleconnect Verbindungen in die Zukunft; Produktinformation; Apr. 1995; pp. 1–16. (English translation provided.).

CBL—Communication by Light, Gesellschaft für optische Kommunikationssysteme mbH; "Optical Links, Network connection directly through the atmosphere"; Mar. 1995; pp. 1–8.

K. H. Kudielka et al.; "Experimental verification of an adaptive optical multi–aperature receive antenna for laser space communications"; *Society of Photo–Optical Instrumentation Engineers,* vol. 2123; 1994; pp. 478–486.

A. S. Acampora et al.; "The Scalable Lightwave Network"; *IEEE Communications Magazine;* Dec. 1994; pp. 36–42.

G. Turinsky; "Kabellose Übertragung von Digital–Audio–und Videosignalen"; Praxis; *RFE;* Mar. 1994; pp. 33–34. (English translation provided.).

Teleconnect GmbH; "Installation Mittweida 1993" (digitized photograph copies); 1993; pp. 1–2.

C. A. Brackett et al; "A Scalable Multiwavelength Multihop Optical Network: A Proposal for Research on All–Optical Networks"; *Journal of Lightwave Technology,* vol. 11, No. 5–6; May–Jun. 1993; pp. 736–753.

J. H. Churnside: "Aperture Averaging of Optical Scintillations in the Turbulent Atmosphere"; *Applied Optics,* vol. 30, No. 15; May 20, 1991; pp. 1982–1994.

W. M. Bruno et al.; "Diode Laser Spatial Diversity Transmitter"; *Society of Photo–Optical Instrumentation Engineers,* vol. 1044; 1989; pp. 187–194.

J. Shamir et al.; "Diversity Methods for Fading Control"; *Applied Optics;* vol. 27, No. 8; Apr. 15, 1988; pp. 1389–1391.

A. S. Acampora; "A Multichannel Multihop Local Lightwave Network"; Globecom '87; *IEEE;* 1987; pp. 1459–1467.

D. L. Fried; "Aperture Averaging of Scintillation"; *Journal of the Optical Society of America,* vol. 57, No. 2; Feb. 1967; pp. 169–175.

Hungarian Patent Office, Search Report for Hungarian National Phase of PCT/US00/35198, which claims priority to U.S. App. 09/482,782; dated Jan. 15, 2003; pp. 1–3.

Korevaar, et al., Status of SDIO/IS&T Lasercom Testbed Program, SPIE–The International Society for Optical Engineering, Jan. 20–21, 1993, pgs. 116–127, vol. 1866, Society of Photo–Optical Instrumentation Engineers, Washington, USA.

Korevaar, et al., Status of BMDO–IST Lasercom Advanced Technology Demonstration, SPIE–The International Society for Optical Engineering, pgs. 96–107, vol. 2123, Society of Photo–Optical Instrumentation Engineers, Washington, USA.

Schuster, et al., Optomechanical Design of STRV–2 Lasercom Transceiver Using Novel Azimuth/slant gimbal, SPIE—the International Society for Optical Engineering, Jan. 30–31, 1996, pp. 227–239, vol. 2699, Society of Photo–Optical Instumentation Engineers, Washington, USA.

Wilson, et al., Preliminary Results of the Ground/Orbiter Lasercomm Demonstration Experiment Between Table Mountain and the ETS–VI Satellite, SPIE—the International Society for Optical Engineering, Jan. 30–31, 1996, pgs. 121–132, vol. 2699, Society of Photo–Optical Instrumentation Engineers, Washington, USA.

\* cited by examiner

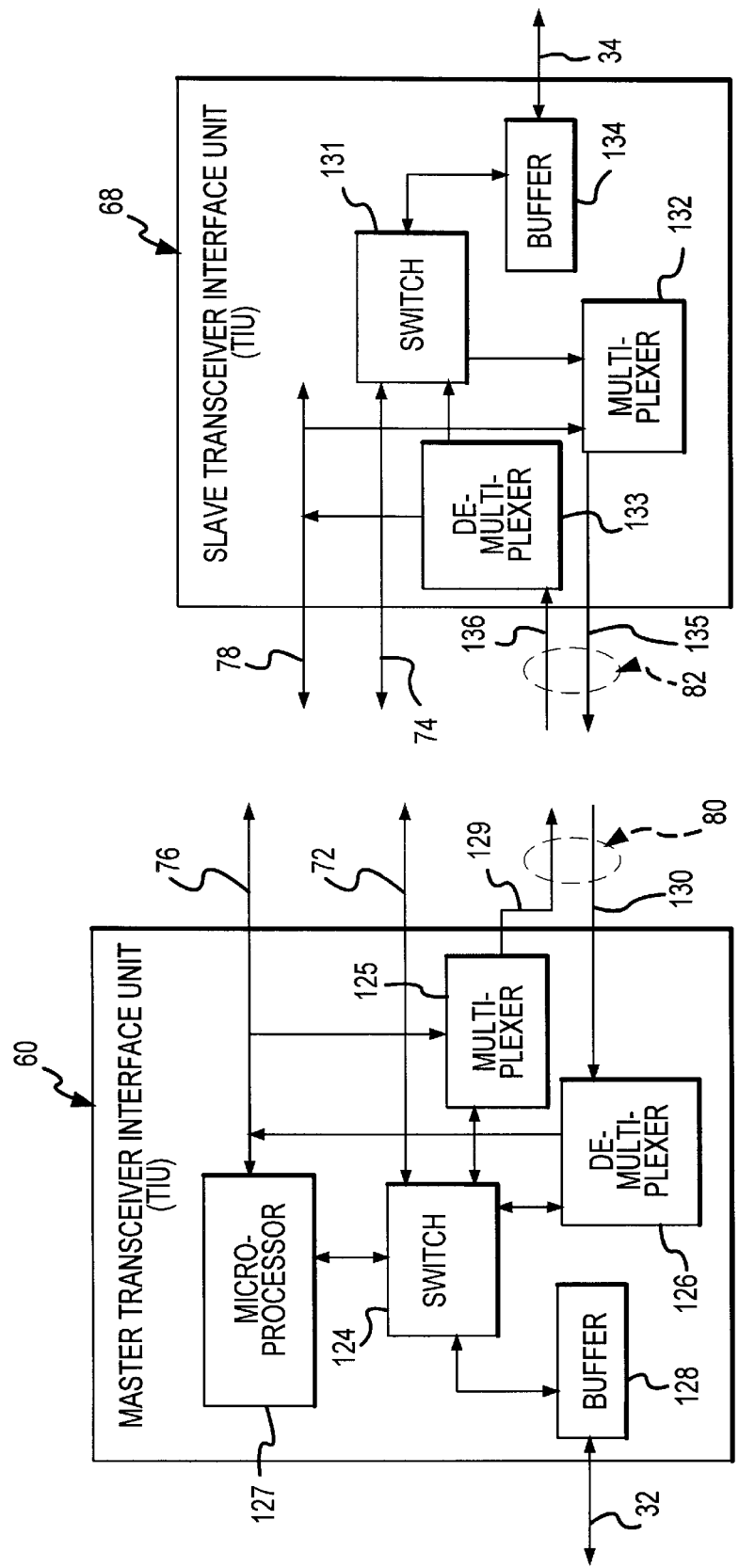

HYBRID WIRELESS OPTICAL AND RADIO FREQUENCY COMMUNICATION LINK

CROSS-REFERENCE TO RELATED INVENTIONS

This invention is related to the following invention, which was made by one of the present inventors: Terrestrial Optical Communication Network of Integrated Fiber and Free-Space Links Which Requires No Electro-Optical Conversion Between Links, U.S. patent application Ser. No. 09/065,685, filed Apr. 24, 1998. The disclosure of this previous U.S. patent application is hereby incorporated by this reference.

STATEMENT REGARDING FEDERALLY SPONSORED RESEARCH OR DEVELOPMENT

This invention was made with Government support under contract DASG60-00-C-0055 awarded by U.S. Army Space and Missile Defense command. The Government has certain rights in the invention.

FIELD OF THE INVENTION

This invention relates to terrestrial optical and radio frequency (RF) data communication systems. More particularly, the present invention relates to a new and improved method and apparatus for communicating data through a communication link having both a free-space optical path and a parallel wireless RF path. The data is transmitted over the higher capacity optical path when favorable free-space atmospheric conditions prevail, and the data is transmitted over the RF path when free-space atmospheric conditions have degraded the effectiveness of the optical path to the point that it is more efficient to transmit the data over the RF path. Control and status information is preferably transmitted over the more reliable RF path in either circumstance.

BACKGROUND OF THE INVENTION

The communications industry requires not only high-speed data communication but also reliability in those communications. In terrestrial communications, some of the most common communication links are wire line, radio frequency (RF), fiber optic and free-space optical. Each of these communication links has different relative different strengths, weaknesses and tradeoffs in speed and reliability. Typically, the optical systems have higher communication data rates, speeds or bandwidths, and the wire line, RF and fiber optic links have greater reliability.

Although fiber optic links are capable of both high speed and high reliability, they have the disadvantage of requiring a physical installation of a fiber optic cable as the communication path or media between communication points. A wire line link also requires the physical installation of wires or cables as the communication path or media. In many situations, however, it is impractical, uneconomical or impossible to install physical cable media between communication points. In these situations, the wireless RF and/or free-space optical links must be used.

Free-space optical links transmit a light or laser beam through the atmosphere between an optical transmitter and an optical receiver. The aforementioned US patent application describes an optical transceiver within a mixed fiber and free-space optical communication system. Free-space optical communication systems require a clear line-of-sight path between communication points, since the light or laser beam projects in a straight line between the communication points. The optical beam is subject to degradation by smoke, dust, fog, rain, snow and any other particles in the atmosphere between the communication points. These particles and substances refract or block light beam to the degree that it is not reliably received at the receiving communication point. At times, atmospheric conditions can so severely degrade quality of the light beam between the communication points that the free-space optics can fail to work altogether or that the communication rate is diminished to an unacceptable level.

Wireless RF communication links involve broadcasting an RF signal carrying the communication data between the communication points. Although the typical RF broadcast is capable of transmitting data at a slower rate than an optical signal, the broadcast RF signal is usually more dependable. Broadcast RF signals are not subject to the same degradations from atmospheric conditions that cause free-space optical transmissions to suffer. Although some RF systems, such as microwave systems, do require an unobstructed line-of-sight transmission path, particles and substances in the air do not cause substantial RF signal degradation. Thus, RF communications can operate reliably under conditions where free-space optical transmissions can not operate reliably, thereby providing a greater assurance of accurate and effective data transmission although at a somewhat lesser data transfer rate.

It is with respect to these and other considerations, that the present invention has evolved.

SUMMARY OF THE INVENTION

The present invention involves a hybrid wireless optical and radio frequency (RF) communication link or system. Optical transceivers at opposite ends of the link provide an optical path for the primary communication of the data, and RF transceivers primarily provide a communication path for control and status information between the optical and RF transceivers. Under atmospheric conditions that cause the optical communication of data to degrade severely or to fail altogether, data communication is automatically switched to the RF path. Although the overall data communication speed may be reduced when the data is transmitted the RF path, a communication link is maintained under all conditions, rather than suspending data communication during atmospheric conditions which are adverse to optical data communication.

The presence of the RF path between the RF transceivers provides for highly reliable communication of the control and status information, regardless of whether the data is communicated over the optical or RF path. Thus, it is possible to pass control and status information to better control the optical transceivers and their optical signal transmissions, even when the optical link is not operating optimally due to deteriorated free-space atmospheric conditions.

These and other improvements are achieved in an improved method for communicating data in a communication link extending across a terrestrial free-space region between two stations at ends of the link. The method involves communicating the data in an optical signal transmitted through a free-space optical path between the two stations, and communicating the data in a radio frequency (RF) signal transmitted through a free-space RF path between the two stations when the data is not transmitted in the optical signal through the optical path. The optical link is used to transmit the data whenever there is a benefit to using the optical path, and the RF link is used whenever atmospheric conditions in the optical path cause of the optical path to fail or degrade the transmission of the optical signals. A failure or degradation of the optical path is recognized by a failed reception of a transmitted optical signal or by the reception of an optical signal which has been degraded to the point that it is difficult to reliably distinguish the information contained in the optical signal. Control and status information is transferred between the optical transceivers over the RF path to communicate that the optical signal has failed or has degraded. Even while the RF link is transmitting the data, it is preferable to continue attempted transmission of optical signals between the communication points to determine when to reestablish the optical path for the transmission of data with the optical signals can be reliably communicated. The two stations preferably alternately generate and transmit the control and status information and send it to the other station. The control and status information includes information which indicates the amount by which one station should change its optical transmitting power according to the other station's assessment of the received power, thereby maintaining effective optical communication without oscillation of the power levels of the two stations.

The previously mentioned and other improvements are also achieved in a hybrid wireless optical and radio frequency (RF) communication link for communicating data between first and second stations, where the first and second stations receive and deliver the data through respective first and second input/output (I/O) signal paths. The hybrid communication link includes a free-space optical link portion comprising a first optical transceiver at the first station and a second optical transceiver at the second station for transmitting and receiving an optical signal therebetween containing the data. The hybrid communication link also includes a free-space RF link portion in parallel with the optical link portion and comprising a first RF transceiver at the first station and a second RF transceiver at the second station for transmitting and receiving an RF signal therebetween containing the data and control and status information for controlling the operation of the optical and RF transceivers. The control and status information controls the functionality of the optical transceivers, without diminishing the capacity or bandwidth of the optical transceivers for transmitting and receiving the data contained in the optical signal. In addition, when the optical path fails or degrades because of atmospheric influences, the data is routed for transmission by the RF transceivers over the RF path. Even though the data transferring capability of the RF path is less than that of the optical path, data may still be transferred under conditions where data transfer would be prohibited by a failed or degraded optical path.

The hybrid communication link receives the data to be transmitted over the optical and RF paths from an input/output (I/O) signal path, and the hybrid link transfers the data it receives from the optical and RF paths onto the I/O signal path. A switch within the station at the end communication links routes the data between the optical link and the I/O signal path in an active mode of operation and routes the data between the RF link and the I/O signal path in a standby mode of operation. A transmission status signal is generated as a part of the control and status information, and transmission status signal indicates whether the optical link can effectively transmit data. The switch responds to the transmission status signal to establish either the active or standby modes of operation. An absence of the optical signal in the optical path is also recognized and causes a switch from the active to the standby mode of operation.

A more complete appreciation of the present invention and its scope, and the manner in which it achieves the above noted improvements, can be obtained by reference to the following detailed description of presently preferred embodiments of the invention taken in connection with the accompanying drawings, which are briefly summarized below, and the appended claims.

BRIEF DESCRIPTION OF THE DRAWINGS

FIG. 5 is a more detailed block diagram of a master transceiver interface unit (TIU) of the hybrid communication link shown in FIG. 3.

FIG. 6 is a more detailed block diagram of a slave transceiver interface unit (TIU) of the hybrid communication link shown in FIG. 3.

DETAILED DESCRIPTION

Figure 1:
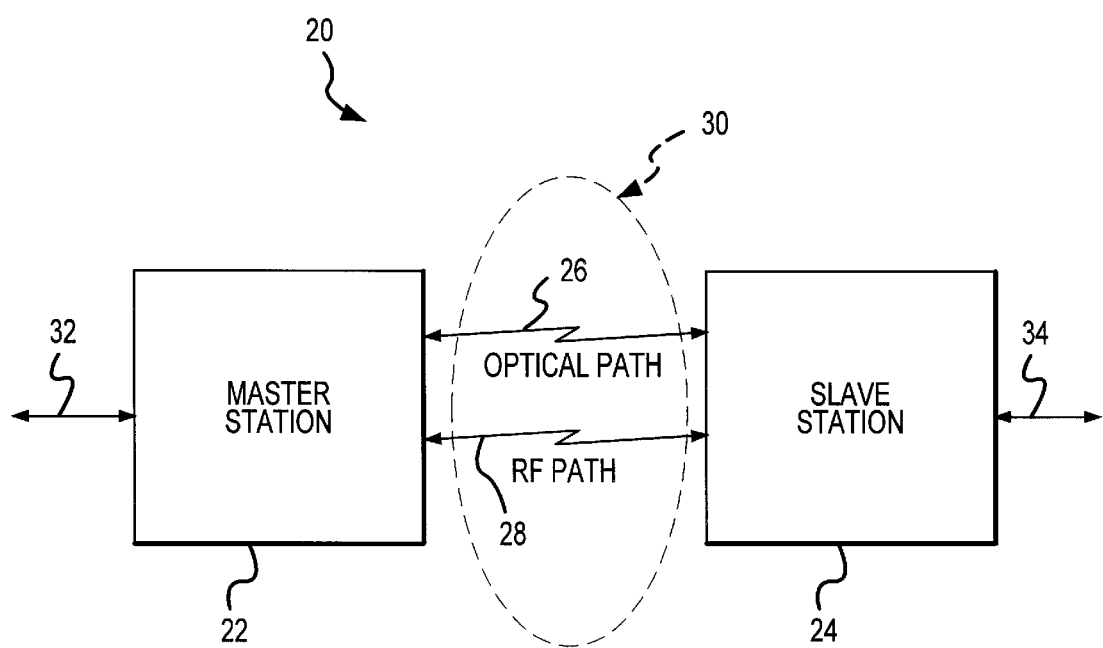
FIG. 1 is a block diagram of a hybrid wireless optical and radio frequency (RF) communication link, which incorporates the present invention.

A hybrid wireless optical and radio frequency (RF) communication link (the hybrid link) 20 is shown in FIG. 1. The hybrid link 20 combines free-space optical communication technology (preferably laser systems which reach a communication speed of many gigabits per second) with high speed RF technology (preferably microwave) to achieve a wireless terrestrial hybrid laser/microwave communication link for the communication of data between two communication end-points of the hybrid link 20 at stations 22 and 24. The integration of these two wireless communication technologies (optical and RF) in the hybrid link 20 increases the statistical availability or reliability of long-distance (e.g. over 1–2 miles in distance), point-to-point wireless communication.

The hybrid link 20 preferably generally comprises a master hybrid communication station (master station) 22 and a slave hybrid communication station (slave station) 24. An optical signal, such as a laser beam, is projected in an optical path 26, and an RF signal, such as a microwave signal, is broadcast in a RF path 28. Both the optical signal in the optical path 26 and the RF signal in the RF path 28 are transmitted across a terrestrial free-space region 30 between the master station 22 and the slave station 24. Data contained in the optical and RF signals is thereby communicated between the two stations 22 and 24. Input/output (I/O) signal paths 32 and 34 connect the master and slave stations 22 and 24, respectively, to other communication stations (not shown) or devices, and thereby connect the hybrid link 20 into a larger communication network or system. The data transmitted in the optical and RF signals is obtained from the I/O signal paths 32 and 34 at one station 22 or 24 and is delivered over the I/O signal paths 34 and 32 at the other station 24 or 22 after communication through the hybrid link 20. The I/O signal paths 32 and 34 may be any source or delivery path of data signals in the communication network or system. For example, the I/O signal paths may be fiber optic or wire channels that connect the master and slave stations 22 and 24 to other wireless stations at the same location, thereby making the hybrid link 20 a repeater in a series of such hybrid links 20 in the communication network or system. Alternatively, the I/O signal paths 32 and 34 may be part of land-based fiber optic or wire communication links to distant land-based communication stations. The data communicated over the hybrid link 20 may comprise any type of user data or information.

The optical path 26 serves as the main or preferred communication path for the data transmitted between the master and slave stations 22 and 24 in an active mode of operation. The RF path 28 serves as the main or preferred communication path for control and status information used to control the operation of the stations 22 and 24. The RF path 28 also serves as a reliable backup data communication path in a standby mode of operation. In the standby mode, the RF path 28 carries the data because the optical path 26 has failed in transmitting successfully or reliably communicating the optical signal through the free-space region 30 between the stations 22 and 24, usually due to the degrading atmospheric or other influences in such as the light refractive influences of rain, fog, mist, snow, dust or other severe weather conditions in the terrestrial free-space region 30, but also because of a possible mechanical or functional failure of the equipment in the optical link portion of the hybrid link 20. The RF path 28 exchanges control and status information between the master and slave stations 22 and 24 in both the active and standby modes and additionally transmits the data in the standby mode.

The master station 22 constantly monitors a received optical power level of a signal received through the optical path 26 from the slave station 24, and vice versa, in both active and standby modes. Based on the received optical power level information, each station 22 and 24 calculates an amount by which the other station 24 or 22 needs to adjust its transmitted optical power level for optimum optical communication in the optical path 26. Additionally, it is preferable that the master and slave stations 22 and 24 transmit at the same optical power level. As part of the control and status information, the master and slave stations 22 and 24 share information regarding the received optical power level, the transmitted optical power level and the calculated power adjustment in order to confirm necessary adjustments and maintain the same transmitted optical power level. When both the master and slave stations 22 and 24 are transmitting optical signals at the same power level, this condition is referred to as "symmetry."

The symmetry of transmitted power levels of the master and slave stations 22 and 24 permits either station 22 or 24 to determine immediately whether the optical path 26 has failed or degraded to the point where it is unreliable or ineffective. When one station 22 or 24 detects that the received optical power level is below an appropriate threshold minimum and its own transmitted optical power level is at a maximum (which, due to the symmetry, means that the transmitted optical power level of the other station is also at a maximum), then adverse conditions in the terrestrial free-space region 30 have degraded. The optical path 26 can no longer be considered as reliable or effective in transmitting data at a higher data rate than that rate at which data can be transferred in the broadcast RF signal in the RF path 28. This condition is referred to herein as a "failure" of the optical path 26. Upon optical failure, the hybrid link 20 switches to the standby mode in which the data is communicated through the RF path 28. Optical signals are continually transmitted in the optical path 26 during the standby mode of operation, and the master and slave stations 22 and 24 continue to monitor the received optical power level of the optical signals in the optical path 26 in the standby mode, even though the data is transferred in the RF signal through the RF path 28. By continually monitoring the optical signals in the optical path 26 during the standby mode of operation, the hybrid link 20 can switch back to the active mode upon dissipation of the adverse influences in the free-space region 30 to allow reliable optical communication of data in the optical path 26. Information regarding optical failure is continuously shared between the master and slave stations 22 and 24 in the status and control information transmitted in the RF path 28, so that both stations 22 and 24 make the switch between the active and standby modes in a manner in which no data is lost.

Figure 2:
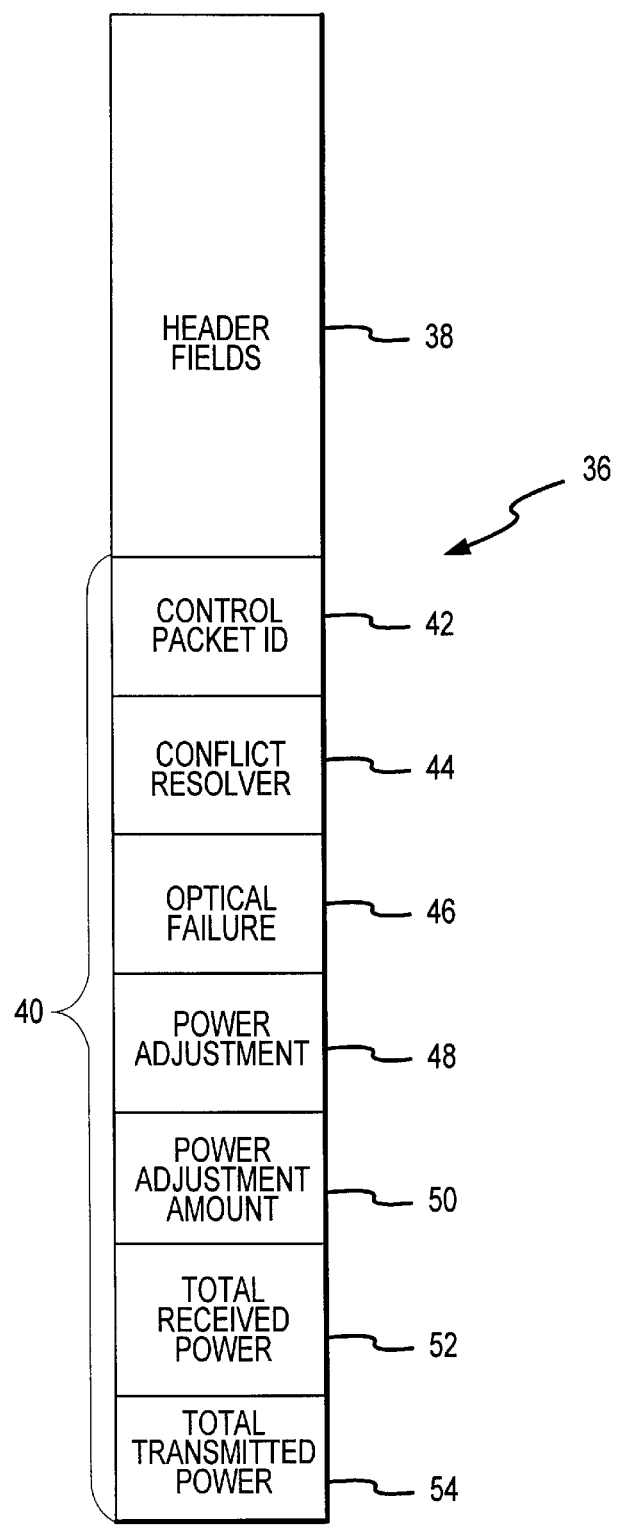
FIG. 2 is an illustration of a data structure for a control token packet utilized in the hybrid communication link shown in FIG. 1.

The master and slave stations 22 and 24 share control and status information by communicating a control token packet 36, an exemplary data structure of which is shown in FIG. 2, back and forth between the stations. The control packet 36 comprises header fields 38 and content fields 40. The particular header fields 38 depend on the particular communication protocol being used. In this example, the control packet 36 is representative of a packet for the well-known Asynchronous Transfer Mode (ATM) switching protocol. Thus, the content of the header fields 38 is set according to the ATM protocol standard. The processing of the optical and RF network data signals in the optical and RF paths 26 and 28 is independent of, or transparent to, the protocol used to transmit the data. However, encapsulation of the control and status information into the control packet 36 (FIG. 2) depends on the communication protocol used by the hybrid link 20. The standard Internet Protocol (IP) switching protocol is another example of such a well-known protocol.

The ATM protocol is capable of delivering quality of service and optimizing delay for voice, data, video and image communication systems. Therefore, it is considered to represent a presently unifying technology. The ATM protocol is scalable, enabling a standard 53-byte cell to be transported from LAN (local area network) to LAN via WAN (wide area network). The ATM protocol can also be used on public and private WANs. The 53-byte cell consists of a 5-byte header (the header fields 38) and a payload of 48 bytes of information (the content fields 40). The header fields 38 generally comprise the destination, payload type, priority, and an error check field. The control and status information are encapsulated into one ATM packet (the control packet 36) with the payload type field set to 001, or some other unique identifier indicative of a control packet 36. The 48-byte payload (the content fields 40) is used to transport other control and status information between the master and slave stations 22 and 24 (FIG. 1).

Ideally, the rate at which the control packet 36 is passed between the master and slave stations 22 and 24 should depend on how fast the quality of the optical path 26 (FIG. 1) is changing. However, given the small size of the control packet 36 (53 bytes), its transmission will consume an almost-insignificant amount of the bandwidth of the RF path 28. Therefore, the control packet 36 may be passed back and forth at a constant rate or at other predetermined intervals.

The content fields 40 preferably comprise a control packet identification (ID) field 42, a conflict resolver field 44, an optical failure field 46, a power adjustment field 48, a power adjustment amount field 50, a total received power field 52 and a total transmitted field 54. The control packet ID field 42 identifies the ATM packet in which it is incorporated.

The conflict resolver field 44 is preferably a single bit that permits the master and slave stations 22 and 24 (FIG. 1) to resolve a conflict when there are two control packets 36. Under normal operation, there will be only one control packet 36 flowing between the master and slave stations 22 and 24. During an initialization mode, however, the master and slave stations 22 and 24 preferably both generate a control packet 36, so the brief presence of the two control packets 36 must be resolved. During normal operation in active or standby mode, the master and slave stations 22 and 24 pass back and forth a single control packet 36 with the conflict resolver field 44 set to an "operational" state or indication (e.g. a 1). In the initialization mode, however, the master and slave stations 22 and 24 both generate control packets 36 with the conflict resolver field 44 set to an "initial" state or indication (e.g. a 0), but the master station 22 subsequently changes the conflict resolver field 44 in its control packet 36 from the initial state to the operational state, as described below with respect to FIG. 3, before routing the control packet 36 to the slave station 24. The master and slave stations 22 and 24 both discard any received control packet 36 that contains a conflict resolver field 44 set to the initial state. Thus, the master station 22 discards the first control packet 36 received upon initialization. The slave station 24, on the other hand, receives and processes the first control packet 36 from the master station 22, since the master station 22 sets the conflict resolver field 44 of its first generated control packet to the operational state. Therefore, only one control packet 36 is afterwards passed back and forth in the hybrid link 20 (FIG. 1). The master and slave stations 22 and 24 each re-generate the control packet 36 if it does not receive the control packet 36 from the other station within a predetermined timeout period. This timeout period may be user configurable.

The optical failure field 46 is preferably a single bit that indicates the transmission status of the optical path 26 (FIG. 1), i.e. whether the optical path 26 is functioning properly or has failed. Whenever the master or slave station 22 or 24 (FIG. 1) has possession of the control packet 36 and cannot detect a proper signal in the optical path 26 and it is transmitting at its maximum optical power level, then the master or slave station 22 or 24 sets the optical failure field 46 to a "failed" status or indication. On the other hand, whenever the master or slave station 22 or 24 has possession of the control packet 36 and can detect a proper signal in the optical path 26, then the master or slave station 22 or 24 sets the optical failure field 46 to an "okay" status or indication. When in active mode and the optical failure field 46 is set to the failed status, the hybrid link 20 (FIG. 1) switches from the active mode of operation to the standby mode of operation where the data is communicated over the RF path 28 (FIG. 1). When in the standby mode and a control packet is received with its optical failure field 46 set to the okay status, the hybrid link 20 switches from the standby mode to the active mode.

The power adjustment field 48 is preferably two bits, set by the station sending the control packet 36, set to indicate whether the transmitted optical power level at the receiving station needs to be left unchanged, decremented or incremented. The power adjustment amount field 50 is preferably several bits indicating the amount by which the sending station is instructing the receiving station to adjust its transmitted optical power level. Thus, when the receiving station receives the control packet 36 containing the power adjustment field 48 indicating that the power level needs to be increased or decreased and the receiving station concurs that the power level should be increased or decreased, the receiving station updates its transmitted optical power level according to the amount indicated by the power adjustment amount field 50.

The total received power field 52 is preferably several bits indicating the optical power level of the received signal in the optical path 26 (FIG. 1). Upon receipt of the control packet 36, the receiving station preferably compares the enclosed total received power field 52 with its local transmitted optical power level and/or the local received optical power level to further confirm any amount by which it is to adjust its transmitted optical power level.

The total transmitted power field 54 is preferably several bits indicating the optical power level at which the station sending the control packet 36 is transmitting the signal in the optical path 26 (FIG. 1). With the total transmitted power field 54, the receiving station can compare the optical power level at which it is transmitting the signal in the optical path 26 with the optical power level at which the sending station is transmitting the signal in the optical path 26 and can synchronize the optical power levels or confirm power level symmetry of operation.

Figure 3:
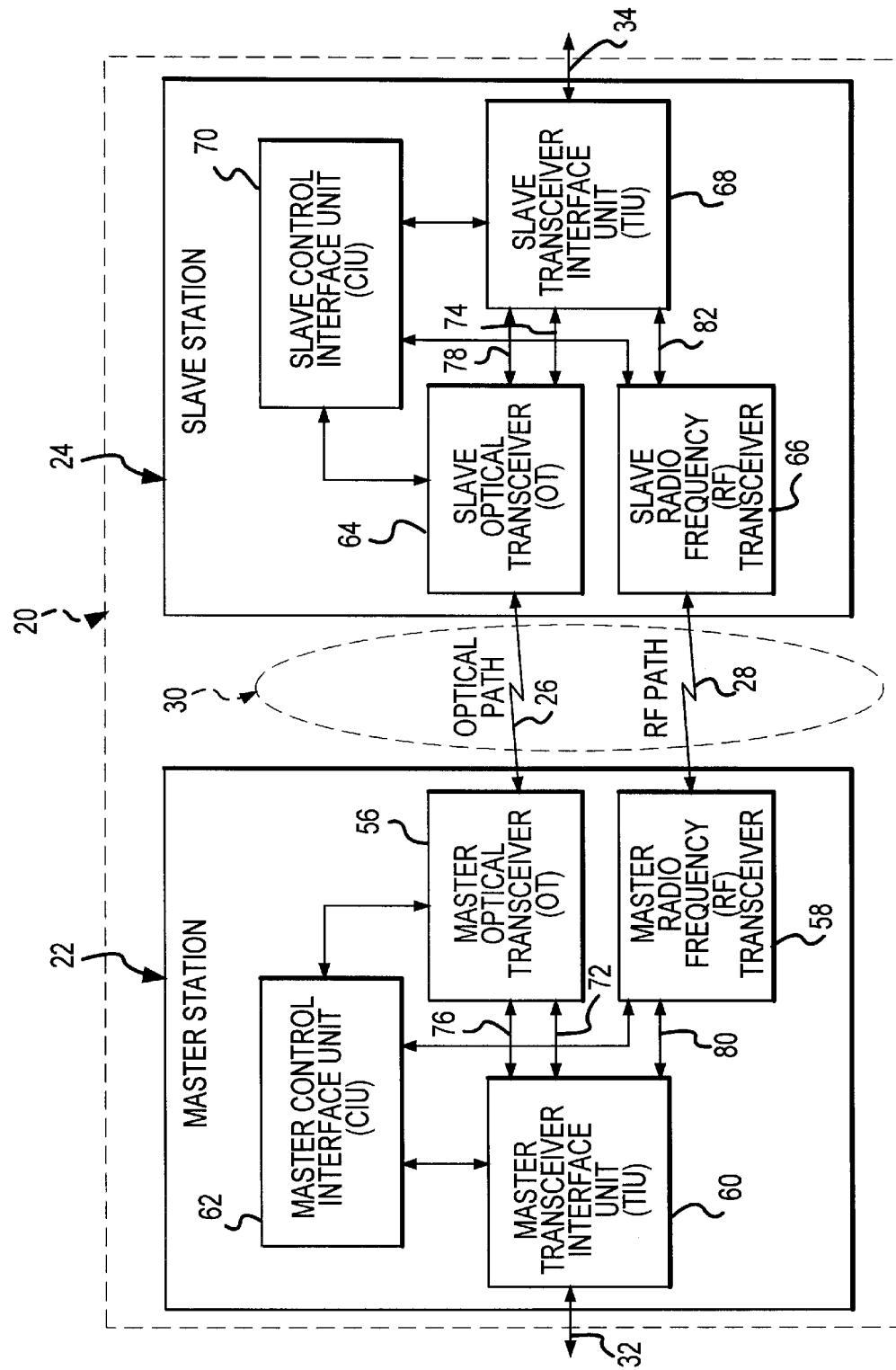
FIG. 3 is a more detailed block diagram of the hybrid communication link shown in FIG. 1.

More details concerning the hybrid link 20 are shown in FIG. 3. The master station 22 generally comprises a master optical transceiver (OT) 56, a master RF transceiver 58, a master transceiver interface unit (TIU) 60 and a master control interface unit (CIU) 62. Likewise, the slave station 24 generally comprises a slave OT 64, a slave RF transceiver 66, a slave TIU 68 and a slave CIU 70.

The master and slave OTs 56 and 64 communicate with each other through the optical beams in the optical path 26 which are projected or directed through the terrestrial free-space region 30. Thus, the master and slave OTs 56 and 64 and the optical path 26 generally form an optical link portion of the hybrid link 20. Likewise, the master and slave RF transceivers 58 and 66 communicate with each other through the RF signals broadcast in the RF path 28 across the terrestrial free-space region 30. Thus, the master and slave RF transceivers 58 and 66 and the RF path 28 generally form a RF link portion of the hybrid link 20. The RF link portion communicates in parallel with the optical link portion of the hybrid link 20. The RF and optical link portions both connect to and utilize the master TIU 60 and the master CIU 62 of the master station 22 and the slave TIU 68 and the slave CIU of the slave station 24.

The master and slave OTs 56 and 64 process and amplify the optical beams in the optical path 26 for transmission and reception. The master and slave OTs 56 and 64 also analyze the status and control information of the content fields 40 of the control packet 36 (FIG. 2) received from the opposite station. Upon receipt of the control packet 36, the master OT 56 compares its optical transmission power with the total transmitted power information contained in the total transmitted power field 54 (FIG. 2) which the slave OT 64 included in the control packet 36, and vice versa, in order to maintain symmetrical power operation. The master and slave OTs 56 and 64 adjust the optical power level with which they transmit the optical beam in the optical path 26 based on the other station's assessment of the received optical power, which is carried in the total received power field 52 of the received control packet 36. The control packet 36 is always updated at the master and slave OTs 56 and 64. The master and slave OTs 56 and 64 update the content fields 40 of the control packet 36 with new control data collected from assessing the optical power level of the received optical beam and their transmitted optical power level and submit the updated control packet 36 to their respective master or slave TIU 60 or 68 for routing to the opposite station.

The master and slave TIUs 60 and 68 route the data to their respective master and slave OTs 56 and 64 across an optical data I/O bus 72 and 74, respectively, when the optical beams 26 are functioning properly without undue atmospheric degradation of signal strength and integrity, i.e. in active mode. The master and slave TIUs 60 and 68 also receive the control packets 36 (FIG. 2) from their respective master or slave OT 56 and 64 via a control bus 76 and 78, respectively. The master and slave. TIUs 60 and 68 route the control packet 36 in a data stream to their respective master or slave RF transceiver 58 and 66 via an RF data I/O bus 80 and 82, respectively, for transmission to the receiving station. The master and slave TIUs 60 and 68 extract the control packet 36 from the data stream arriving from their respective RF transceivers 58 and 66.

The master and slave TIUs 60 and 68 also seamlessly switch transmission of the data to their respective RF transceivers 58 and 66 either when the status and control information contained in the control packet 36 (FIG. 2) indicates a failure in the optical path 26 or when there is an absence of data coming through the optical path 26. Alternatively, the master and slave TIUs 60 and 68 may route data to either the respective master and slave OTs 56 and 64 or the respective master and slave RF transceivers 58 and 66 simultaneously, thereby ensuring high-speed communication in the active mode. In this case, when the optical path 26 fails, the master and slave TIUs 60 and 68 route data through the respective master and slave RF transceivers 58 and 66, thereby ensuring communication availability in the standby mode.

The control packets 36, whether originated by the master OT 56 or the slave OT 64, are routed to the master TIU 60 for processing. The control packets 36 that are received by the slave TIU 68 through its slave RF transceiver 66 are routed to the connected slave OT 64 without any further processing. Thus, the master TIU 60 processes the control packets 36 generated at both ends of the hybrid link 20. The master TIU 60 reads the optical failure field 46 to perform the active-to-standby switch. If either the master or slave station 22 or 24 warns of an optical failure, the master TIU 60 starts the active-to-standby mode switching process. It is also the master TIU 60 that processes the conflict resolver field 44 to maintain one control packet 36 in continuous use.

The slave TIU 68 senses when there is an absence of activity along its optical data I/O bus 74, and concludes that the master TIU 60 has already started the active-to-standby mode switching process. In this case, the slave TIU 68 switches the data to the RF path 28.

The hybrid link 20 is independent of the specifications for the RF transceivers 58 and 66 incorporated into the overall hybrid link 20. Thus, the hybrid link 20 has the flexibility to accommodate a variety of conventionally available RF system devices. For example, military users may incorporate a military proprietary radio system that uses proprietary frequencies assigned by the FCC. Additionally, wireless service providers which possess an RF license are able to use RF transceivers designed to operate within the licensed RF wavelengths.

When the master RF transceiver 58 receives the data and/or control packet 36 (FIG. 2) from the master TIU 60, the master RF transceiver 58 prepares it for broadcast as an RF signal. The slave RF transceiver 66 on the receiving side detects the RF signal and processes the RF signal to recover the transmitted digital signal (i.e. the data and control packet 36) before sending it to the slave TIU 68. A similar process occurs for the oppositely-flowing RF communicated data and control packet.

While data is flowing through the optical path 26 in both directions, the RF path 28 serves as a reliable path to transmit and receive the control and status information in the control packet 36 (FIG. 2). Wireless RF links are much more reliable than wireless optical links under severe weather conditions. Therefore, it is preferable for the RF link portion of the hybrid link 20 to carry the control and status information at all times, although the optical path 26 may be used to carry the control and status information under conditions where high-quality optical signals may be communicated through the free-space region 30 (FIG. 1) or when there has been an equipment or functional failure in the RF link portion of the hybrid link 20.

Figure 4:
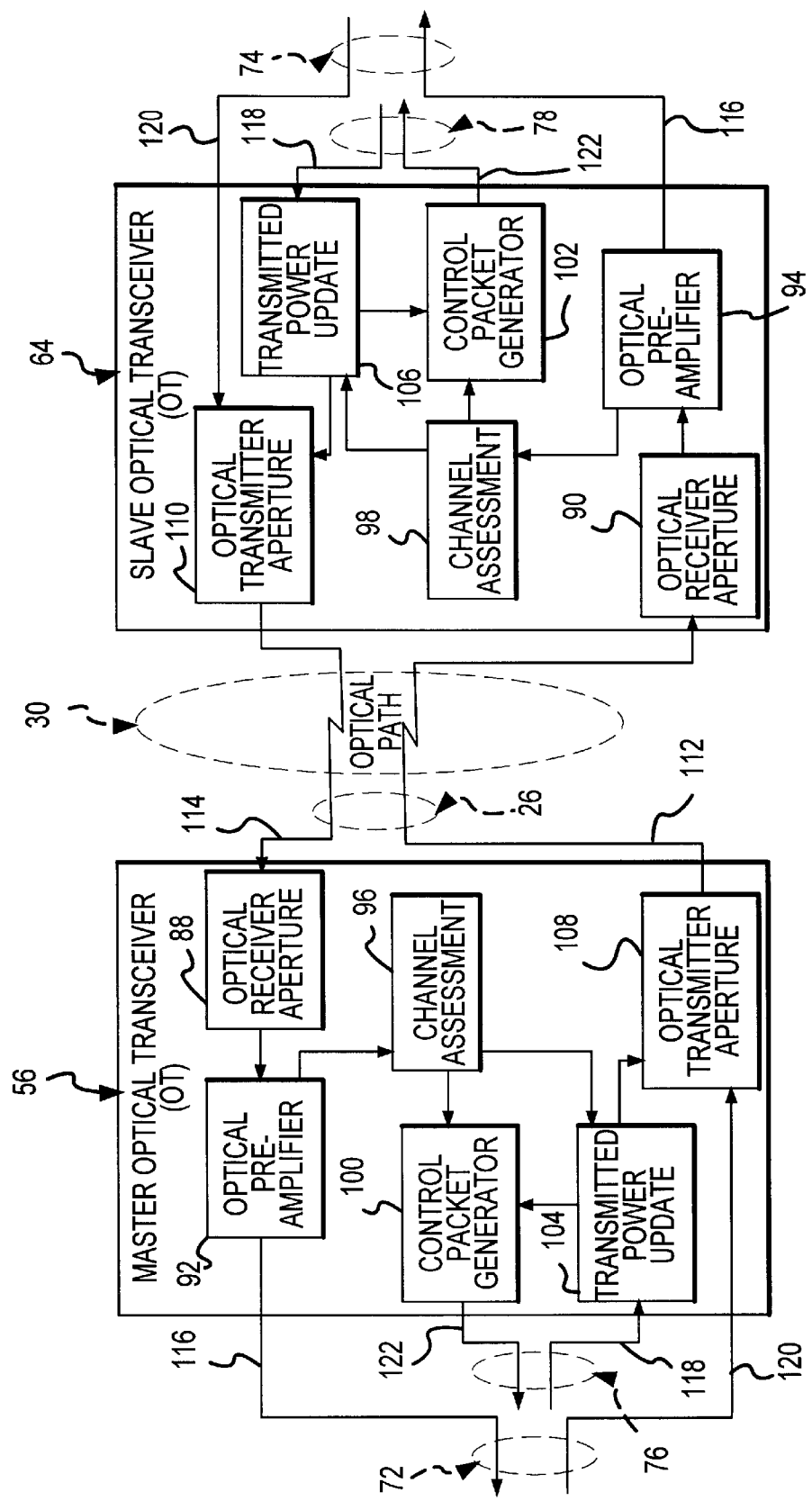
FIG. 4 is a more detailed block diagram of a master optical transceiver and a slave optical transceiver of the hybrid communication link shown in FIG. 3.

More details concerning the optical link portion of the hybrid link 20, including the master OT 56 and the slave OT 64, are shown in FIG. 4. The master and slave OTs 56 and 64 may be all-optical devices or may incorporate conventional optical-to-electronic conversion. The latter is used to incorporate error correcting codes, and possibly proprietary header insertion. It is preferred that the optical link portion use an adaptive power control technique to optimally communicate within the optical path 26, as described in the aforementioned US patent application.

The master OT 56 and the slave OT 64 are generally similar in structure and operation. The master OT 56 and the slave OT 64 comprise an optical receiver aperture 88 and 90, an optical pre-amplifier 92 and 94, a channel assessment unit 96 and 98, a control packet generator 100 and 102, a transmitted power update unit 104 and 106 and an optical transmitter 108 and 110, respectively. Control lines (not shown) to each of these elements, permits the master and slave CIUs 62 and 70 (FIG. 3) to provide appropriate control signals to these elements. The optical path 26 through the terrestrial free-space region 30 generally comprises a master-to-slave beam 112, transmitted by the optical transmitter 108 and received by the optical receiver aperture 90, and a slave-to-master beam 114, transmitted by the optical transmitter 110 and received by the optical receiver aperture 88.

Since the master OT 56 and the slave OT 64 are generally similar, only the elements and function of the master OT 56 will be described. The same description applies to the corresponding elements of the slave OT 64. The optical receiver aperture 88 receives the slave-to-master beam 114 and sends it to the optical pre-amplifier 92. The optical pre-amplifier 92 amplifies the slave-to-master beam 114 as needed to detect a distinguishable communication signal containing the data, depending on the signal strength, or power, of the slave-to-master beam 114. The optical pre-amplifier 92 is only adjusted locally within the master OT 56 according to the optical power level of the received optical power. The amplified beam is delivered on a data-out path 116 to the master TIU 60 (FIG. 3)(or a data-out path 116 to the slave TIU 68 (FIG. 4)). The optical pre-amplifier 92 it is connected to the channel assessment unit 96 to provide a signal indicative of the power level of the slave-to-master beam 114 or the amount of amplification required to create the amplified beam. From this information, the channel assessment unit 96 determines the quality of the slave-to-master beam 114 and sends this information to the control packet generator 100 and to the transmitted power update unit 104. The channel assessment unit 96 implements a conventional digital signal processor (DSP) algorithm in either a conventional field programmable gate array (FPGA) or a conventional DSP operating in combination with a conventional microprocessor (not shown) controlling the master OT 56.

The transmitted power update unit 104 receives the beam quality signal from the channel assessment unit 96 and the control packet 36 (FIG. 2) from a control data input path 118. Based on the beam quality signal from the channel assessment unit 96 and the information contained in the power adjustment field 48 (FIG. 2) and in the power adjustment amount field 50 (FIG. 2) of the control packet 36, the transmitted power update unit 104 determines the amount of power, if any, by which the optical transmitter 108 is to adjust an incoming optical signal on a data-in path 120 to form the outgoing master-to-slave beam 112. Thus, when the transmitted power update unit 104 (FIG. 4) receives the control packet 36 containing the power adjustment field 48 indicating that the transmitted optical power level needs to be increased or decreased and the beam quality signal from the channel assessment unit 96 provides a concurring assessment, then the transmitted power update unit 104 supplies a signal to the optical transmitter 108 to update the transmitted optical power level according to the amount indicated by the power adjustment amount field 50. The optical transmitter 108 may not permit continuous power adjustment, so the power adjustment may be performed by small step increments. The transmitted power update unit 104 implements a conventional digital signal processor (DSP) algorithm in either a conventional field programmable gate array (FPGA) or a conventional DSP operating in combination with the conventional microprocessor (not shown) controlling the master OT 56.

The optical transmitter 108 receives the incoming optical signal on the data-in path 120 from the master TIU 60 (FIG. 3)(or the data-in path 120 from the slave TIU 68 (FIG. 4)). The data-out path 116 and the data-in path 120 generally form the optical data I/O bus 72 connecting to the master TIU 60 (or the optical data I/O bus 74 connecting to the slave TIU 68).

The control packet generator 100 receives the beam quality signal from the channel assessment unit 96 and power adjustment data from the transmitted power update unit 104 and generates the control packet 36 (FIG. 2). The control packet generator 100 creates the control packet 36 had supplies it on a control data output path 122. The control data input path 118 and the control data output path 122 generally form the control bus 76 (or the control bus 78). The control packet generator 100 implements a conventional digital signal processor (DSP) algorithm in either a conventional field programmable gate array (FPGA) or a conventional DSP operating in combination with the conventional microprocessor (not shown) controlling the master OT 56.

Under severe weather conditions, for example, either the master or slave OT 56 or 64 may detect degradation of the optical signal from the optical path 26 while transmitting using its highest optical transmitting power. In this situation, if the master OT 56 detects the optical beam degradation, then the master OT 56 sets the optical failure field 46 (FIG. 2) within the control packet 36 (FIG. 2) to the "failed" status and submits the control packet 36 to the master TIU 60 (FIG. 3) via the control bus 76. Otherwise, if the slave OT 64 detects the optical beam degradation, then the slave OT 64 sets the optical failure field 46 to the "failed" status and routes the control packet 36 to the slave RF transceiver 66 (FIG. 3) via the slave TIU 68 (FIG. 3) and to the master TIU 60. The master TIU 60 processes the control packet 36 from either the master or slave station to switch the data communication to the RF link portion of the hybrid link 20, thereby establishing the standby mode of operation, when an optical link failure or degradation is detected. The slave OT 64 then stops receiving data from the optical path 26, so the slave TIU 68 senses the absence of activity on its optical data I/O bus 74 and switches the data to the RF link portion of the hybrid link 20, thereby also establishing the standby mode of operation.

For a control packet 36 (FIG. 2) that originates in the master station 22, the master RF transceiver 58 sends the control packet 36 to the slave RF transceiver 66, which conveys the control packet 36 to the slave TIU 68 (FIG. 3). The slave TIU 68, which has probably already performed the switch to the standby mode, routes the control packet 36 to the slave OT 64 for processing.

When data flows through the RF path 28, the hybrid link 20 continues communicating control and status information between the master station and the slave station via the control packet 36 (FIG. 2); The continued communication of the control packet 36 allows the hybrid link 20 to switch back to the active mode when the optical path 26 shows improvement from its failed condition. The master and slave OTs 56 and 64 monitor the performance of the optical path 26 by attempting to exchange a synchronization bitstream at frequencies similar to those used to optically transfer the data while the data is routed through the RF path 28. The synchronization bitstream is generated by the master and slave OTs 56 and 64 and is not transmitted to the master and slave TIUs 60 and 68. The synchronization bitstream is also used during initialization to align the master and slave OTs 56 and 64 before the data is communicated therebetween.

It is preferable that the master OT 56 and the master RF transceiver 58 (FIG. 3) always deliver power similarly, or symmetrically, to the slave OT 64 (FIG. 3) and the slave RF transceiver 66 (FIG. 3), and vise versa. Furthermore, all switching between the active and standby modes occurs seamlessly and without data loss.

Under normal operating conditions and normal weather conditions, the master and slave TIUs 60 and 68 route the data to and from the master and slave OTs 56 and 64 (FIG. 3), respectively. During initialization, however, the master and slave OTs 56 and 64 transmit the synchronization bitstream using maximum optical power. Afterwards, depending on the amount of received optical power at each station 22 and 24, the master and slave OTs 56 and 64 adjust the transmitted optical power level of their optical transmitters 108 and 110 (FIG. 4), respectively, in order not to saturate the receiving optical pre-amplifiers 94 and 92, respectively. The master and slave OTs 56 and 64 will both be operating using the same optical power level due to the symmetrical power control properties of the optical link portion of the hybrid link 20, described above.

Once the optical link portion of the hybrid link 20 is optimized in initialization, the master and slave OTs 56 and 64 (FIG. 3) both build the control packet and send it to the master and slave TIUs 60 and 68, respectively, using the control buses 76 and 78, respectively. While waiting to receive the control packet 36, the master and slave OTs 56 and 64 keep monitoring the optical path 26 using the received optical power level. The master and slave OTs 56 and 64 adjust their transmitted power level after receiving, processing and updating the contents of the control packet 36, as described above.

The RF path 28 provides a reliable avenue for synchronizing the master and slave OTs 56 and 64 (FIG. 3), such that each one adjusts its power while the other waits for its turn. In this instance, the master and slave OTs 56 and 64 will each adjust its transmitted power level only when it holds the control packet. Thus, the control packet serves to synchronize the power adjustment between the master and slave stations and to allow the master and slave OTs 56 and 64 each to adjust its transmitting power level synchronously according to the reception level of the other OT 64 or 56.

In an alternative technique to update the transmitted optical power of the optical transmitters 108 and 110 (FIG. 4), the master or slave OT 56 or 64 (FIG. 3) updates its transmitting power based only on the optical power received by the optical receivers 88 and 90 (FIG. 4). However, while one of the master or slave OT 56 or 64 is in the process of adjusting its transmitted power level based on the received optical power, the other one of the master or slave OT 56 or 64 may be in the process of adjusting its transmitted power in the opposite direction. Thus, the hybrid link 20 (FIG. 1) may fall into oscillation modes wherein the master and slave OTs 56 and 64 keep adjusting their transmitted power levels back and forth. This situation reduces the efficiency of the hybrid link 20, and is therefore not preferred.

In initialization as described above, the master and slave OTs 56 and 64 each generate control packets 36, and each OT initially sets the conflict resolver field 68 to the "initial" status. Each OT sends the control packet 36 for routing to the other station, respectively. During operation in the active or standby modes after initialization, the master and slave OTs 56 and 64 ensure that the control packet has the conflict resolver field 44 set to the "operational" status. The master and slave OTs 56 and 64 also discard any received control packet that contains a conflict resolver field 44 set to the "initial" status. Thus, the master OT 56 discards the first control packet 36 received from the slave OT 64. The slave OT 64, on the other hand, receives and processes the first control packet 36 from the master OT 56, since the master station 22 changed the conflict resolver field 44 to the "operational" status in this control packet. Additionally, the master and slave OTs 56 and 64 each re-generate the control packet 36 if it does not receive the control packet 36 from the other side within the defined time frame.

The hybrid link 20 may be controlled to switch between the active and standby modes of operation by externally applied control signals, as well as by the result of internally assessing the quality of the optical beam in the optical path in the manner just described. The master and slave CIUs 62 and 70 may comprise computers, modems or other types of network control and monitoring devices, which supply the control signals for switching modes of operation externally. Therefore, the hybrid link 20 may be monitored and controlled through a local or a remote system controller. When the hybrid link 20 is configured for external control, the master and slave CIUs 62 and 70 command the master and slave TIUs 60 and 68, the master and slave OTs 56 and 64 and the master and slave RF transceivers 58 and 66 (FIG. 3), to monitor and control the hybrid link 20. Additionally, the master TIU 60 maintains an updated copy of the most recent control packet 36, which is accessible by the master CIU 62.

Thus, the master and slave CIUs 62 and 70 command the master and slave TIUs 60 and 68, respectively, to perform the switch between the active and standby modes. The master and/or slave CIU 62 or 70 may issue a command to switch to or from the standby mode for system maintenance, equipment upgrades or other reasons relating to the performance of the data transmission in the optical path. When the hybrid link 20 is internally controlled, however, the switching from the active to standby modes occurs automatically upon optical beam failure or degradation due to severe weather condition or failure of either of the master or slave OT 56 or 64. The switch back to the active mode happens automatically when the atmospheric conditions in the free-space region 30 recovers sufficiently to provide reliability and effectiveness in communicating the optical signal through the optical path 26. Thus, the master and slave CIUs 62 and 70 play the role of a remote control interface unit that commands the master and slave TIUs 60 and 68, the master and slave OTs 56 and 64 and the master and slave RF transceivers 58 and 66. Having both a master CIU 62 and a slave CIU 70 provides independent control at both the ends of the communication path that are useful to support a modular implementation of the hybrid link 20, wherein each station 22 and 24 is operated independently.

The hybrid link 20 may be implemented in different ways. The master and slave CIUs 62 and 70 (FIG. 3) may be used as remote control unit interfaces to configure, maintain and control the master and slave OTs 56 and 64 (FIG. 3). In the absence of the RF link portion of the hybrid link 20 or the master and/or slave TIU 60 and/or 68, a user will configure the optical amplifier and pre-amplifier levels of the optical transmitters 108 and 110 (FIG. 4) and the optical pre-amplifiers 92 and 94 (FIG. 4), respectively, depending on the distance between the master and slave OTs 56 and 64.

In another alternative implementation, the RF path 28 may carry data independently of the data carried by the optical path 26. In other words, both the optical path 26 and the RF path 28 are fully utilized simultaneously for the communication of data. In this case, the hybrid link 20 may be installed without the presence of either the master or the slave TIU 60 or 68 (FIG. 3). In this case, the master and slave OTs 56 and 64 (FIG. 3) operate independently of the master and slave RF transceivers 58 and 66. Thus, neither the master nor the slave OT 56 or 64 generates control packets 36.

More details concerning the master TIU 60 are shown in FIG. 5. The master TIU 60 generally comprises a switch 124, a multiplexer 125, a de-multiplexer 126, a microprocessor 127 and a buffer 128. Control lines (not shown) generally connect the master CIU 62 (FIG. 3) to the microprocessor 127, so that the master CIU 62 can remotely control the master TIU 60. The I/O signal path 32 generally connects to the switch 124 through the buffer 128 to send and receive the data. Under the normal active mode of operation, the switch 124 routes the data through the optical data I/O bus 72 to the master OT 56 (FIG. 3). The switch 124 is connected to the multiplexer 125 and the de-multiplexer 126. In the standby mode of operation, the switch 124 sends the data through the multiplexer 125 and an outgoing RF path 129 to the master RF transceiver 58 (FIG. 3), and the switch 124 receives the data from the master RF transceiver 58 through an incoming RF path 130 and the de-multiplexer 126. The switch 124 thereby routes the data through the RF link portion of the hybrid link 20. The outgoing RF path 129 and the incoming RF path 130 generally form the RF data I/O 80 bus between the master TIU 60 and the master RF transceiver 58.

The multiplexer 125 generally multiplexes the control packet and the data, and the de-multiplexer 126 generally de-multiplexes the control packet and the data, when in the standby mode. In active mode, however, there is generally no additional data with respect to which the control packet is multiplexed or de-multiplexed, since the data is sent via the master OT 56 (FIG. 3) in the active mode. In other words, the information received by either the master or slave TIU 60 or 68 from the respective master or slave RF transceiver 58 or 66 always includes the control packet 36 from of the other station. When the RF path 28 (FIG. 1) carries the data, the master and slave TIUs 60 and 68 extract the control packets 36 from the incoming RF data stream before routing the data to the I/O signal path 32 or 34, respectively. The master TIU 60 processes the control packet 36 and routes it to the master OT 56; whereas, the slave TIU 68 routes the control packet to the slave OT 64 without any further processing.

The control bus 76 is connected to the microprocessor 127, the multiplexer 125 and the de-multiplexer 126, so that the control packet may pass between each of these elements and the master OT 56 (FIG. 3). The control packet received from the master OT 56 is passed to the microprocessor 127 and the multiplexer 125. The multiplexer 125 multiplexes the control packet with the data received from the switch 124, if necessary, and passes the control packet to the master RF transceiver 58 (FIG. 3) for transmission to the slave station 24 (FIG. 1). The control packet received from the slave station 24 through the master RF transceiver 58 is de-multiplexed with respect to the data, if necessary, by the de-multiplexer 126 and passed through the control bus 76 to the microprocessor 127 and the master OT 56. The microprocessor 127 processes the control packet, whether received from the master OT 56 or the slave station 24, to determine whether to place the hybrid link 20 (FIG. 1) in the active or standby modes of operation. The microprocessor 127 is connected to the switch 124 to send a control signal to cause the switch 124 to switch between the active mode and the standby mode, depending on the contents of the control packet 36.

In initialization described above, it is the microprocessor 127 that, upon receipt of the control packet 36 from the master OT 56 (FIG. 3) with a conflict resolver field 44 (FIG. 2) set to the "initial" status, changes the conflict resolver field 44 information to the "operational" status. For any other control packet 36, the microprocessor 127 leaves the conflict resolver field 44 unchanged.

When in the active mode and the microprocessor 127 receives the control packet with an optical failure field 46 (FIG. 2) set to the "failed" status, the microprocessor 127 initiates the switch from the active mode to the standby mode. When in the standby mode and the microprocessor 127 receives the control packet 36 with an optical failure field 46 set to the "okay" status, the microprocessor 127 initiates the switch from the standby mode to the active mode. Additionally, the master station 22 performs the switch from active to standby mode, even without an optical failure field 46 set to the "failed" status, when the master switch 124 fails to detect a signal along the optical link portion of the hybrid link 20.

When operating in the active mode of operation, the switch 124 is controlled by the microprocessor 127 to deliver the data from the I/O signal path 32 and buffer 128 to the optical data I/O bus 72.

More details concerning the slave TIU 68 are shown in FIG. 6. The slave TIU 68 generally comprises a switch 131, a multiplexer 132, a de-multiplexer 133 and a buffer 134, which are each similar in function to the switch 124, multiplexer 125, de-multiplexer 126 and buffer 128 shown in FIG. 5. The function of the slave TIU 68 is similar to the function of the master TIU 60 (FIG. 5). However, although the slave TIU 68 may include a microprocessor (not shown), it does not process the control packet 36 as does the master TIU 60 (see FIG. 5). Therefore, the function of determining whether to switch the hybrid link 20 into the active or standby mode is performed entirely in the master TIU 60. The slave TIU 68, on the other hand, switches between modes depending on whether data is actually being received on the optical data I/O bus 56. Control lines (not shown) generally connect the slave CIU 70 (FIG. 3) to the elements of the slave TIU 68 for remote control thereof.

The switch 131 is connected to the optical data I/O bus 74, the buffer 134, the multiplexer 132 and the de-multiplexer 133. When in active mode, the switch 131 sends and receives the data through the optical data I/O bus 74.and the slave OT 64 (FIG. 3). When in the standby mode, the switch 131 routes the data from the I/O signal path 34 and the buffer 134 to the multiplexer 132 and an outgoing RF path 135 and from an incoming RF path 136 and the de-multiplexer 133 to the buffer 134 and the I/O signal path 34. The outgoing RF path 135 and the incoming RF path 136 generally form the RF data I/O bus 82 between the slave TIU 68 and the slave RF transceiver 66 (FIG. 3). The switch 131 switches from active mode to standby mode upon detecting that data is not present on the optical data I/O bus 74, since the lack of data on the optical data I/O bus 74 is an indication that the master TIU 60 (FIG. 3) has placed the hybrid link 20 (FIG. 1) into standby mode. Thus, the switch 131 in particular, and the slave TIU 68 in general, perform the function of a signal router for routing the data through the appropriate optical or RF path.

The control bus 78 is connected to the multiplexer 132 and the de-multiplexer 133, so that the control packet may pass between each of these elements and the slave OT 64 (FIG. 3). The control packet received from the slave OT 56 is passed to the multiplexer 132. The multiplexer 132 multiplexes the control packet 36 with the data received from the switch 131, if necessary, and passes the control packet to the slave RF transceiver 66 (FIG. 3) for transmission to the master station 22 (FIG. 1). The control packet received from the master station 22 through the slave RF transceiver 66 is de-multiplexed from the data, if necessary, by the de-multiplexer 133 and passed through the control bus 78 to the slave OT 64. The control packet is preferably not processed in any manner within the slave TIU 68, but is merely passed through between the RF data I/O bus 82 and the control bus 78, since the function of switching between the active mode and standby mode is performed automatically upon the detection by conventional circuitry in the switch 131 of the absence of data on the optical data I/O bus 74.

The master TIU 60 processes the control and status information in the control packet flowing between the master OT 56, master RF transceiver 58 and the master CIU 62 (FIG. 3). The master TIU 60 includes the buffer 128 to dynamically store and down-convert the data rate of the data received from the I/O signal path 56 when a switch in mode of operation from the optical path 26 to the RF path 28 is ordered. The buffer 128 is used to store data until the rest of the communication network or system (not shown), to which the I/O signal paths 32 and 34 (FIG. 1) connect, is instructed to lower its data transmission rate to match the lesser data transmission rate through the RF path 28. The stored data can be re-transmitted if minor data loss occurs during the active-to-standby mode switching process due to a delay between communication network or system data transmission rate end-to-end switching. The size of the buffer 128 is chosen to support high-speed interface protocols, and the data rates at which bits are extracted from the buffer 128 can be configured to support those interfaces.

The slave TIU 68 includes the buffer 134 to dynamically store and down-convert the input data rate of the data received from the I/O signal path 56 when a switch from the optical path 26 to the RF path 28 is ordered. The buffer 128 is used to store data until the rest of the network (not shown), to which the I/O signal paths 56 and 58 connect, is informed to lower its transmission speed. The stored data can be re-transmitted if minor data loss occurs during the active-to-standby switching process due to a delay between end-to-end switching. The size of the buffer 128 is chosen to support all high-speed interface protocols, and the data rates at which bits are extracted from the buffer 128 can be configured to support those interfaces.

Figure 7:
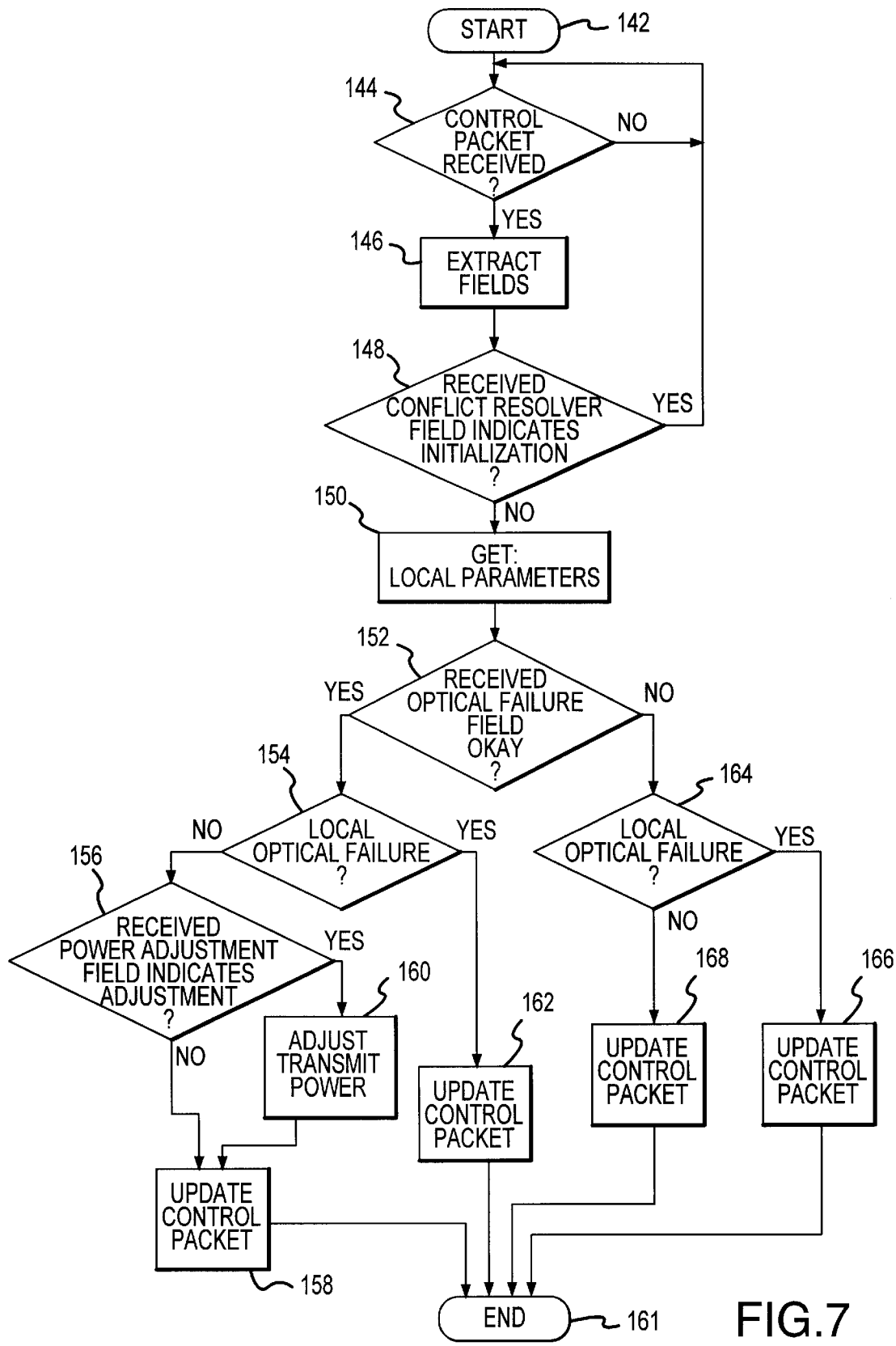
FIG. 7 is a flowchart of a power control procedure executed by the master and slave stations to adjust the transmission optical power level of the optical transceivers shown in FIG. 3 and to assemble the control and status information contained in the control packet shown in FIG. 2.

A general adaptive power control procedure performed by the control packet generator 100 and 102 (FIG. 4) of the master and slave OTs 56 and 64 (FIG. 2), respectively, to assess the received optical power level, adjust the transmitted optical power level and assemble the control packet 36 (FIG. 2), is shown in FIG. 7. The adaptive power control procedure operates in both the active and standby modes. In the active mode, the adaptive power control procedure adjusts the optical transmitted power level based on the information carried in the received control packet 36 and the power level of the received optical path 26. The adaptive power control procedure updates the content fields 40 (FIG. 2) of the control packet 36 before sending the control packet 36 across the terrestrial free-space region 30. In the standby mode, the adaptive power control procedure maintains maximum power transmission and does not update the control packet until the optical link portion of the hybrid link 20 shows communication improvement. In the standby mode, the optical failure field 46 will always indicate a "failed" status until the optical link portion of the hybrid link 20 becomes adequate for data transmission. Then the optical failure field 46 changes to indicate the "okay" status, allowing the active mode of operation to resume.

The adaptive power control procedure starts at step 142. At step 144, it is determined whether the control packet 36 (FIG. 2) has been received. If not, then the procedure enters a loop at step 144 waiting for the control packet to be received. If the determination at step 144 is positive, i.e. the control packet has been received, then the various content fields 40 (FIG. 2) are extracted at step 146. At step 148, it is determined whether the received conflict resolver field 44 (FIG. 2) indicates that the received control packet 36 was generated in the initialization stage when the conflict resolver field 44 is set to the "initial" status (e.g. a 0). If so, the control packet is discarded and the procedure returns to step 144 to wait for the next control packet. If the determination at step 148 is negative, i.e. the control packet was not generated in the initialization stage, then the local parameters (e.g. local total received power based on the beam quality signal from the channel assessment unit 96 or 98 (FIG. 4), and the local total transmitted power based on the setting of the transmitted power update unit 104 or 106 (FIG. 4)) that will be used to update the control packet, are retrieved at step 150.

At step 152, it is determined whether the optical failure field 46 (FIG. 2) indicates that the optical link portion of the hybrid link 20 is properly operating, thereby exhibiting an "okay" status. If so, then at step 154, it is determined whether failure of the optical link portion of the hybrid link 20 is indicated locally, which may happen in this situation if the optical link portion of the hybrid link 20 is deteriorating more rapidly than the time it takes for the control packet 36 to travel from one station to the other. If not, the hybrid link 20 is presumed to operate in the active mode, and it is determined whether the transmitted optical power level is to be adjusted up, down or not at all according to the value of the received power adjustment field 48 (FIG. 2) at step 156. If the determination at step 156 is negative, the control packet is updated at step 158. If the determination at step 156 is positive, i.e. the transmitted optical power level is to be adjusted, then the transmitted optical power level of the optical transmitter 108 or 110 (FIG. 4) is adjusted according to the value indicated in the received power adjustment amount field 50 (FIG. 2) at step 160. The control packet is thereafter updated at step 158. After the control packet has been updated at step 158, the adaptive power control procedure ends at step 161.

When the control packet 36 is updated at step 158, the conflict resolver field 44 (FIG. 2) remains unchanged. Depending on whether the local total received power is below a minimum threshold and the local total transmitted power is already set to its maximum, the optical failure field 46 is set to exhibit a "failed" status. Otherwise, the optical failure field 46 is set to reflect the "okay" status. The power adjustment field 48 is set to reflect the "unchanged" status if the local total received power is between the minimum threshold and a maximum threshold. The power adjustment field 48 is set to the "increase" status if the local total received power is below the minimum threshold and the local total transmitted power is not yet maximized. The power adjustment field 48 is set to the "decrease" status if the local total received power is above the maximum threshold. If the power adjustment field 48 is set to indicate the "increase" or "decrease" status, then the power adjustment amount field 50 is set to the amount by which the optical power level for the opposite station 22 or 24 is to be changed, depending on the values of the local total received power and the local total transmitted power. The total received power field 52 and the total transmitted power field 54 are loaded with the values of the local total received power and the local total transmitted power.

If the determination at step 154 is positive, indicating that the optical link portion has failed locally, then the control packet is updated at step 162. When the control packet is updated at step 152, the conflict resolver field 44 (FIG. 2) remains unchanged. The optical failure field 46 (FIG. 2) is set to indicate the "failed" status. The power adjustment field 48 (FIG. 2) and the power adjustment amount field 50 (FIG. 2) are both preferably set to zero, since optical failure is indicated only when it is not possible to further increase the transmitted optical power level, and since it is undesirable to decrease the transmitted optical power level when optical failure is indicated. The total received power field 52 (FIG. 2) and the total transmitted power field 54 (FIG. 2) are loaded with the values of the local total received power and the local total transmitted power.

If the determination at step 152 is negative, i.e. the optical failure field 46 (FIG. 2) indicates that the optical link portion has failed, then the microprocessor 127 will have begun the switch from active to standby mode of operation, and at step 164, it is determined whether failure of the optical link portion is also indicated locally. If so, then the optical link portion is still inoperative, the hybrid link is still in standby mode, and the control packet is updated accordingly at step

166. The conflict resolver field 44 (FIG. 2) is unchanged. The optical failure field 46 (FIG. 2) is maintained at the "failed" status. The power adjustment field 48 (FIG. 2) and the power adjustment amount field 50 (FIG. 2) are preferably set to zero. The total received power field 52 (FIG. 2) and the total transmitted power field 54 (FIG. 2) are loaded with the values of the local total received power and the local total transmitted power. After updating the control packet at step 166, the procedure ends at step 161.

If the determination at step 164 is negative, indicating that the local optical link portion is operating properly, then the optical path 26 is assumed to have recovered and the control packet is updated accordingly at step 168. When updating the control packet at step 168, the conflict resolver field 44 (FIG. 2) remains unchanged. Depending on whether the local total received power is below a minimum threshold and the local total transmitted power is already set to its maximum, the optical failure field 46 (FIG. 2) is set to the "failed" status. Otherwise, the optical failure field 46 is set to the "okay" status. The power adjustment field 48 (FIG. 2) is set to indicate "unchanged" if the local total received power is between the minimum threshold and a maximum threshold. The power adjustment field 48 is set to indicate "increase" if the local total received power is below the minimum threshold and the local total transmitted power is not yet maximized. The power adjustment field 48 is set to indicate "decrease" if the local total received power is above the maximum threshold. If the power adjustment field 48 is set to indicate "increase" or "decrease," then the power adjustment amount field 50 (FIG. 2) is set to the amount by which the optical power level for the opposite station 22 or 24 is to be changed, depending on the values of the local total received power and the local total transmitted power. The total received power field 52 (FIG. 2) and the total transmitted power field 54 (FIG. 2) are loaded with the values of the local total received power and the local total transmitted power. Following updating of the control packet at step 168, the procedure ends at step 161.

Figure 8:
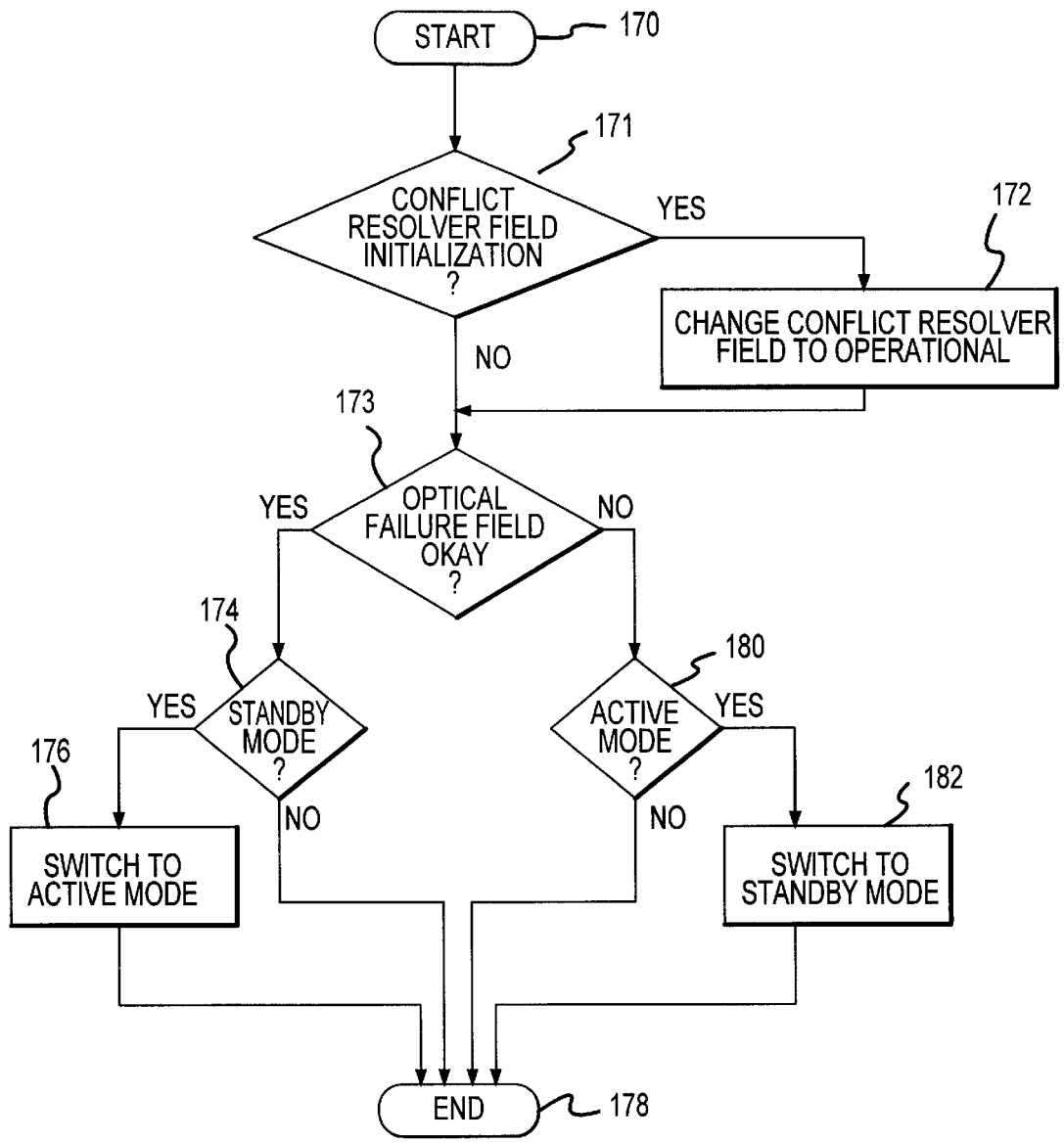
FIG. 8 is a flowchart of the procedure for switching data transmission from the optical path to the RF path of the hybrid communication link shown in FIG. 3, as executed by a master transceiver interface unit shown in FIG. 5.

A procedure for the master TIU 60 (FIG. 3) to switch between the active and standby modes under the control of the microprocessor. 127 (FIG. 5) is shown in FIG. 8. The procedure starts at step 170. At step 171, it is determined whether the conflict resolver field 44 (FIG. 2) in the control packet 36 is set to indicate initialization. If so, then at step 172, the conflict resolver field 44 is changed to "operational." This change occurs for the initial control packet 36 generated upon initialization of the hybrid link 20. At step 173, it is determined whether the optical failure field 46 (FIG. 2) is set to indicate the "okay" status. If so, then at step 174, it is determined whether the hybrid link 20 is currently operating in the standby mode. If so, then the command is issued to switch from the standby mode to the active mode at step 176. Thereafter, the procedure ends at step 178. If the determination at step 174 is negative, i.e. the hybrid link 20 is currently operating in the active mode, then there is no need to switch the mode of operation, and the procedure ends at step 178.

If the determination at step 173 is negative, i.e. the optical failure field 46 (FIG. 2) in the control packet indicates the "failed" status, then at step 180, it is determined whether the hybrid link 20 (FIG. 2) is currently in the active mode. If so, the command is issued to switch from the active mode to the standby mode at step 182, and the procedure thereafter ends at step 178. If the determination at step 180 is negative, i.e. the hybrid link 20 is currently operating in the standby mode, then there is no need to switch the mode, and the procedure ends at step 178.

Figure 9:
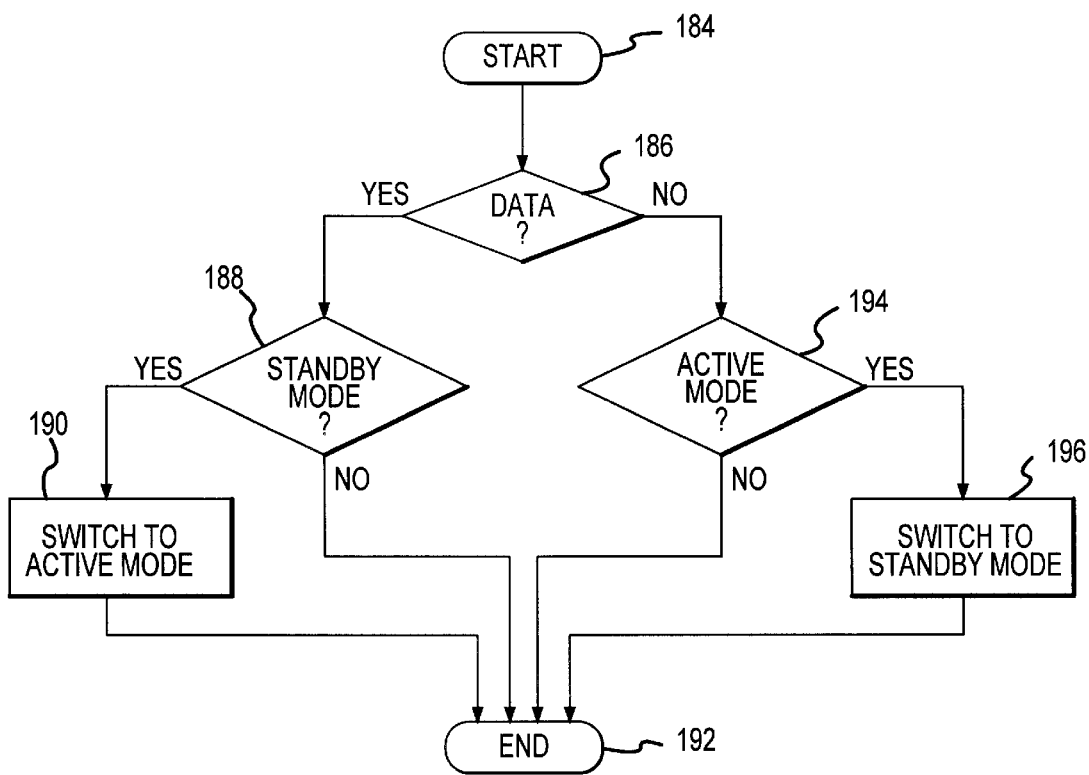
FIG. 9 is a general flowchart of the procedure for switching data transmission from the optical path to the RF path of the hybrid communication link shown in FIG. 3, as executed by a slave transceiver interface unit shown in FIG. 6.

A procedure for the slave TIU 68 to switch between the active and standby modes upon the switch 131 (FIG. 6) automatically detecting the absence of data on the optical data I/O bus 74 (FIG. 4) is shown in FIG. 9. The procedure starts at step 184. At step 186, it is determined whether data is present on the optical data I/O bus 74. If so, then at step 188, it is determined whether the hybrid link 20 is currently in the standby mode. If so, then the switch 131 switches from standby mode to active mode at step 190, because the presence of optical data on the I/O bus indicates that the optical path is now operable. Thereafter the procedure ends at step 192. If the determination at step 188 is negative, i.e. the hybrid link 20 is currently in the active mode, then there is no need to switch the mode, and the procedure ends at step 192.

If the determination at step 186 is negative, i.e. data is not present on the optical data I/O bus 74 (FIG. 4), then at step 194, it is determined whether the hybrid link 20 is currently operating in the active mode. If so, the switch 131 switches from active mode to standby mode at step 196, because the absence of optical data on the optical data I/O bus indicates failed communication through the optical path. Thereafter, the procedure ends at step 192. If the determination at step 194 is negative, i.e. the hybrid link 20 is currently in the standby mode, then there is no need to switch the mode, and the procedure ends at step 192.

The hybrid link 20 has the advantage of high-speed communication through the optical link portion, combined with a reliable communication path for control and status information, as well as a backup data communication path through the RF link portion of the hybrid link. The hybrid link 20 loses communication speed or bandwidth upon switching the data flow from the optical link portion to the RF link portion, but the overall data communication is maintained although at a lower rate. The reliability and availability of the RF link portion permits the reliable exchange control and status data between the master and slave stations 22 and 24 at all times, so synchronization and power symmetry of the master and slave stations 22 and 24 can be maintained even under adverse atmospheric conditions for optimal use of the optical link portion. Even when the optical link portion is failed, control and status information regarding the optical link portion is still shared between the master and slave stations 22 and 24. Many other advantages and improvements will be apparent to those having skill in the art, after gaining a complete understanding and comprehension of the present invention.

Presently preferred embodiments of the invention and its improvements have been described with a degree of particularity. This description has been made by way of preferred example. It should be understood that the scope of the present invention is defined by the following claims, and should not be unnecessarily limited by the detailed description of the preferred embodiment set forth above.

The invention claimed is:

1. A method of communicating data in a communication link extending across a terrestrial free-space region between two stations at ends of the link, comprising the steps of:

communicating the data in an optical signal transmitted through an outdoor free-space optical path between the two stations;

communicating control and status information in a radio frequency (RF) signal transmitted through an outdoor free-space RF path between the two stations concurrently with the transmission of the optical signal that includes the data; and communicating the data and control and status information in an RF signal transmitted in the free-space RF path between the two stations when the data is not transmitted in the optical signal through the optical path.

2. A method as defined in claim 1 further comprising the step of:

communicating the RF signal containing the control and status information between the stations continuously.

3. A method as defined in claim 1 further comprising the steps of:

selecting one of either the optical path or the RF path for communicating the data based on the control and status information; and communicating the data in the selected path.

4. A method as defined in claim 1 further comprising the steps of:

sensing a characteristic of the optical signal received from the optical path;

selecting one of either the optical path or the RF path for communicating the data based upon the sensed characteristic of the optical signal; and communicating the data in the selected path.

5. A method as defined in claim 4 further comprising the steps of:

sensing a failure to receive the optical signal communicated in the optical path as the characteristic for selecting the path; and communicating the data in the RF path upon sensing a failure to receive the optical signal.

6. A method as defined in claim 4 further comprising the steps of:

sensing a power level of the optical signal communicated in the optical path as the characteristic for selecting the path; and communicating the data in the RF path upon the power level of the optical signal communicated in the optical path falling below a predetermined threshold level.

7. A method as defined in claim 6 wherein:

the step of sensing the power level senses a received power level and a transmitted power level of the optical signal communicated in the optical path as a combined characteristic for selecting the path; and the data is communicated in the RF path upon the received power level of the optical signal falling below the predetermined threshold level and the transmitted power level of the optical signal being at about a maximum threshold level.

8. A method as defined in claim 4 further comprising the steps of:

sensing a transmissive capability the optical signal communicated in the optical path as the characteristic for selecting the path; and communicating the data in the RF path upon the transmissive capability of the optical signal communicated in the optical path falling below a transmissive capability of the RF signal communicated in the RF path.

9. A method as defined in claim 4 further comprising the step of:

transmitting a synchronization optical signal through the optical path while the data is communicated in the RF path.

10. A method as defined in claim 9 further comprising the steps of:

including information of a characteristic of the received synchronization signal in the control and status information; and switching the communication of data from the RF path to the optical path based on the information describing the characteristic of the received synchronization signal included in the control and status information.

11. A method as defined in claim 4 further comprising the steps of:

including information of the sensed characteristic in the control and status information; and switching the communication of the data from one path to the other path based on the sensed characteristic information included in the control and status information.

12. A method as defined in claim 1 further comprising the step of:

adjusting an optical power level at which the optical signal is transmitted through the optical path by both stations to maintain a received optical power level within a receiver operational window between a predetermined maximum level and a predetermined minimum level.

13. A method as defined in claim 1 further comprising the step of:

adjusting an optical power level at which the optical signal is transmitted through the optical path by both stations to approximately the same level.

14. A method as defined in claim 13 further comprising the steps of:

transmitting optical power level synchronization information in the control and status information transmitted between the two stations; and establishing the same optical power level for the optical signal transmitted from each of the two stations based on the optical power level synchronization information.

15. A method as defined in claim 14 further comprising the steps of:

generating the control and status information at the one station transmitting-the optical signal to the other station; and including adjustment information in the control and status information which indicates an amount by which the other station is to adjust the optical power level at which the other station transmits the optical signal to the one station.

16. A method as defined in claim 15 further comprising the step of:

adjusting the optical power level at which the other station transmits the optical signal to the one station according to the adjustment information included in the control and status information.

17. A method as defined in claim 15 further comprising the step of:

adjusting the optical power level at which the one station transmits the optical signal by the same amount indicated by the adjustment information which was generated by the one station.

18. A method as defined in claim 1 further comprising the steps of:

selecting one of either the optical path or the RF path for communicating the data based on an external control factor supplied to the stations; and communicating the data in the selected path.

19. A hybrid wireless optical and radio frequency (RF) communication link for communicating data between first and second stations, the first and second stations receiving and delivering the data through respective first and second input/output (I/O) signal paths, comprising:

a free-space optical link portion comprising a first optical transceiver at the first station and a second optical transceiver at the second station for transmitting and receiving an optical signal through an outdoor free-space optical path therebetween; and a free-space RF link portion in parallel with the optical link portion and comprising a first RF transceiver at the first station and a second RF transceiver at the second station for transmitting and receiving an RF signal through an outdoor free-space RF path therebetween;

wherein the RF signal communicates control and status information for controlling the operation of the optical and RF transceivers and is transmitted concurrently with the optical signal when the optical signal communicates the data, and wherein the RF signal communicates the data and control and status information when the optical signal does not communicate the data.

20. A hybrid wireless optical and radio frequency (RF) communication link for communicating data between first and second stations, the first and second stations receiving and delivering the data through respective first and second input/output (I/O) signal paths, comprising:

a free-space optical link portion comprising a first optical transceiver at the first station and a second optical transceiver at the second station for transmitting and receiving an optical signal therebetween containing the data;

a free-space RF link portion in parallel with the optical link portion and comprising a first RF transceiver at the first station and a second RF transceiver at the second station for transmitting and receiving an RF signal therebetween containing the data and control and status information for controlling the operation of the optical and RF transceivers;

a first switch at the first station connected to the optical link portion, the RF link portion and the first I/O signal path, the first switch routing the data between the first optical transceiver and the first I/O signal path in an active mode and routing the data between the first RF transceiver and the first I/O signal path in a standby mode; and a second switch at the second station connected to the optical link portion, the RF link portion and the second I/O signal path, the second switch routing the data between the second optical transceiver and the second I/O signal path in an active mode and routing the data between the second RF transceiver and the second I/O signal path in a standby mode; and the first switch responds to the control and status information to switch between the active and standby modes.

21. A communication link as defined in claim 20 wherein:
one of the first or second optical transceivers of the optical link portion generates a transmission status signal indicative of whether the optical link portion can effectively communicate the data.

22. A communication link as defined in claim 21 wherein:
the transmission status signal is included in the control and status information; and
the first switch responds to the transmission status signal to switch between the active and standby modes.

23. A communication link as defined in claim 20 wherein:
one of the first or second switches switches from the active mode to the standby mode in response to the absence of data transmitted through the optical link portion.

24. A communication link as defined in claim 20 wherein:
the first and second switches operate in the active mode when the optical link portion transmits data; and
the first and second switches operate in the standby mode when the optical link portion fails to transmit the data.

25. A hybrid wireless optical and radio frequency (RF) communication link for communicating data between first and second stations, the first and second stations receiving and delivering the data through respective first and second input/output (I/O) signal paths, comprising:

a free-space optical link portion comprising a first optical transceiver at the first station and a second optical transceiver at the second station for transmitting and receiving an optical signal therebetween containing the data;

a free-space RF link portion in parallel with the optical link portion and comprising a first RF transceiver at the first station and a second RF transceiver at the second station for transmitting and receiving an RF signal therebetween containing the data and control and status information for controlling the operation of the optical and RF transceivers;

a first switch at the first station connected to the optical link portion, the RF link portion and the first I/O signal path, the first switch routing the data between the first optical transceiver and the first I/O signal path in an active mode and routing the data between the first RF transceiver and the first I/O signal path in a standby mode; and a second switch at the second station connected to the optical link portion, the RF link portion and the second I/O signal path, the second switch routing the data between the second optical transceiver and the second I/O signal path in an active mode and routing the data between the second RF transceiver and the second I/O signal path in a standby mode; and the first switch responds to the control and status information to switch between the active and standby modes;

wherein,
the control and status information includes a control token packet which is transmitted back and forth between the first and second stations through the RF link portion and which contains power adjustment information;

the power adjustment information generated by a sending one of the first or second optical transceivers;

the power adjustment information indicating an amount by which the other receiving one of the first or second optical transceivers is to change an optical transmission power level at which the receiving optical transceiver should transmit the optical signal to the sending optical transceiver.

26. A communication link as defined in claim 25 wherein:
the receiving optical transceiver responds to receipt of the power adjustment information contained in the control token packet by changing the optical transmission power level at which the receiving optical transceiver transmits the optical signal.

27. A communication link as defined in claim 25 wherein:
the sending optical transceiver changes the optical transmission power level at which the sending optical transceiver transmits the optical signal by the same amount indicated by the power adjustment information which the sending optical transceiver generated.

28. A method for use in free-space communications, comprising the steps of:

transmitting data in an optical signal through an outdoor free-space optical path of a communication link;

transmitting control and status information in a radio frequency (RF) signal through an outdoor free-space RF path of the communication link concurrently with the transmission of the optical signal that includes the data; and transmitting the data and control and status information in the RF signal through the free-space RF path of the communication link when the data is not transmitted in the optical signal through the optical path.

29. A method in accordance with claim 28, wherein the data is switched from being transmitted in the optical signal to being transmitted in the RF signal based on the control and status information.

30. A method in accordance with claim 28, further comprising the step of:

continuing to transmit the optical signal through the free-space optical path when the data and control and status information is being transmitted in the RF signal through the free-space RF path.

31. An apparatus for use in free-space communications, comprising:

means for transmitting data in an optical signal through an outdoor free-space optical path of a communication link;

means for transmitting control and status information in a radio frequency (RF) signal through an outdoor free-space RF path of the communication link concurrently with the transmission of the optical signal that includes the data; and means for transmitting the data and control and status information in the RF signal through the free-space RF path of the communication link when the data is not transmitted in the optical signal through the optical path.

32. An apparatus in accordance with claim 31, further comprising:

means for switching the data from being transmitted in the optical signal to being transmitted in the RF signal based on the control and status information.

33. An apparatus in accordance with claim 31, further comprising:

means for continuing to transmit the optical signal through the free-space optical path when the data and control and status information is being transmitted in the RF signal through the free-space RF path.

34. An apparatus for use in free-space communications, comprising:

an optical transceiver configured to transmit data in an optical signal through an outdoor free-space optical path of a communication link during an active mode of operation; and a radio frequency (RF) transceiver configured to transmit control and status information in an RF signal through an outdoor free-space RF path of the communication link concurrently with the transmission of the optical signal that includes the data during the active mode of operation;

wherein the RF transceiver is further configured to transmit the data and control and status information in the RF signal through the free-space RF path of the communication link during a standby mode of operation.

35. An apparatus in accordance with claim 34, wherein the optical transceiver is further configured to transmit the optical signal through the free-space optical path during the standby mode of operation.

36. An apparatus for use in free-space communications, comprising:

an optical transceiver configured to transmit optical signals through an outdoor free-space optical path of a communication link;

a radio frequency (RF) transceiver configured to transmit RF signals through an outdoor free-space RF path of the communication link; and interface circuitry coupled to the optical transceiver and the RF transceiver and configured to, send data to the optical transceiver for transmission through the free-space optical path during an active mode of operation, send control and status information to the RF transceiver for transmission through the free-space RF path concurrently with the transmission of data through the free-space optical path during the active mode of operation, and send data and control and status information to the RF transceiver for transmission through the free-space RF path during a standby mode of operation.

37. An apparatus in accordance with claim 36, wherein the interface circuitry is further configured to switch from the active mode to the standby mode based on the control and status information.

38. An apparatus in accordance with claim 36, wherein the interface circuitry is further configured to cause the optical transceiver to transmit during the standby mode of operation.

* * * * *